United States Patent
Nilsson et al.

(10) Patent No.: US 10,299,120 B2
(45) Date of Patent: May 21, 2019

(54) METHODS AND ARRANGEMENTS FOR IDENTIFICATION OF USER EQUIPMENTS FOR AUTHENTICATION PURPOSES

(71) Applicant: Telefonaktiebolaget LM Ericsson (publ), Stockholm (SE)

(72) Inventors: Daniel Nilsson, Älvängen (SE); Qian Chen, Mölndal (SE); Chunbo Wang, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/308,132

(22) PCT Filed: Dec. 4, 2014

(86) PCT No.: PCT/SE2014/051454
§ 371 (c)(1),
(2) Date: Nov. 1, 2016

(87) PCT Pub. No.: WO2015/195022
PCT Pub. Date: Dec. 23, 2015

(65) Prior Publication Data
US 2017/0134947 A1    May 11, 2017

Related U.S. Application Data

(60) Provisional application No. 62/013,640, filed on Jun. 18, 2014.

(51) Int. Cl.
*H04W 12/06* (2009.01)
*H04W 36/14* (2009.01)
(Continued)

(52) U.S. Cl.
CPC .......... *H04W 12/06* (2013.01); *H04W 36/14* (2013.01); *H04W 8/26* (2013.01); *H04W 84/042* (2013.01);
(Continued)

(58) Field of Classification Search
CPC .............................. H04W 12/06; H04W 36/14
See application file for complete search history.

(56) References Cited

U.S. PATENT DOCUMENTS

2002/0191575 A1    12/2002  Kalavade et al.
2003/0235174 A1 *  12/2003  Pichna ................ H04L 63/0853
                                              370/338
(Continued)

FOREIGN PATENT DOCUMENTS

EP    1672945 A1    6/2006
EP    2079253 A1    7/2009
(Continued)

OTHER PUBLICATIONS

Valmikam, R. et al., "EAP Attributes for WiFi—EPC Intergration", Netext Internet-Draft, Jun. 10, 2014, pp. 1-15, IETF.
(Continued)

*Primary Examiner* — Christopher M Brandt
(74) *Attorney, Agent, or Firm* — Coats & Bennett, PLLC

(57) ABSTRACT

A method for assigning a cellular network identity. The method comprises receiving (222), in a user equipment capable to attach to a cellular network and a wireless local area network, a unique representation of a user equipment context of the user equipment and in what cellular network node the user equipment is or is going to be attached, from a network node. The unique representation is labelled (224) as a cellular network identity and cellular network identity is stored (226) a pseudonym identity and/or a fast re-authentication identity in a memory in the user equipment.

18 Claims, 22 Drawing Sheets

(51) Int. Cl.
    *H04W 88/06*    (2009.01)
    *H04W 92/02*    (2009.01)
    *H04W 8/26*     (2009.01)
    *H04W 84/12*    (2009.01)
    *H04W 84/04*    (2009.01)

(52) U.S. Cl.
    CPC ............ *H04W 84/12* (2013.01); *H04W 88/06* (2013.01); *H04W 92/02* (2013.01)

(56) References Cited

U.S. PATENT DOCUMENTS

| | | | |
|---|---|---|---|
| 2005/0078824 A1* | 4/2005 | Malinen | H04L 63/08 380/247 |
| 2006/0046714 A1 | 3/2006 | Kalavade | |
| 2006/0205387 A1* | 9/2006 | Laitinen | H04L 29/12009 455/411 |
| 2012/0127956 A1 | 5/2012 | Wang et al. | |
| 2014/0051393 A1 | 2/2014 | Mildh et al. | |
| 2014/0349609 A1* | 11/2014 | Xu | H04W 12/06 455/411 |
| 2015/0271668 A1* | 9/2015 | Sun | H04W 12/04 455/411 |

FOREIGN PATENT DOCUMENTS

| | | |
|---|---|---|
| EP | 2107726 A1 | 10/2009 |
| EP | 2161963 A1 | 3/2010 |

OTHER PUBLICATIONS

Aboba, B., et al., "RADIUS (Remote Authentication Dial in User Service) Support for Extensible Authentication Protocol (EAP)", Network Working Group Request for Comments: 3579, Sep. 1, 2003, pp. 1-46, The Internet Society.

Haverinen, E. et al., "Extensible Authentication Protocol Method for Global System for Mobile Communications (GSM) Subscriber Identity Modules (EAP-SIM)", Network Working Group Request for Comments: 4186, Jan. 1, 2006, pp. 1-92, The Internet Society.

Arkko J., et al., "Extensible Authentication Protocol Method for 3rd Generation Authentication and Key Agreement (EAP-AKA)", Network Working Group Request for Comments: 4187, Jan. 1, 2006, pp. 1-79, The Internet Society.

* cited by examiner

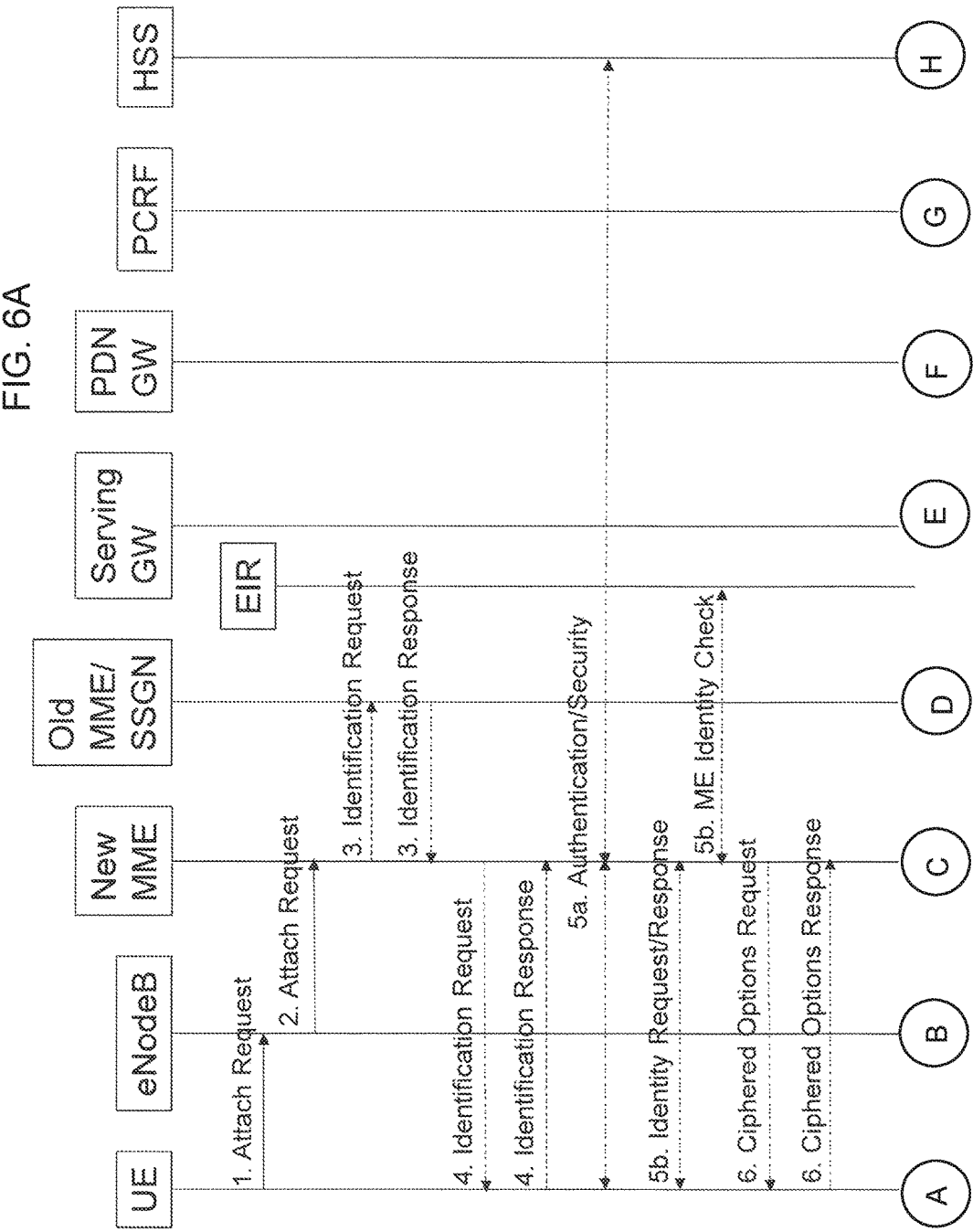

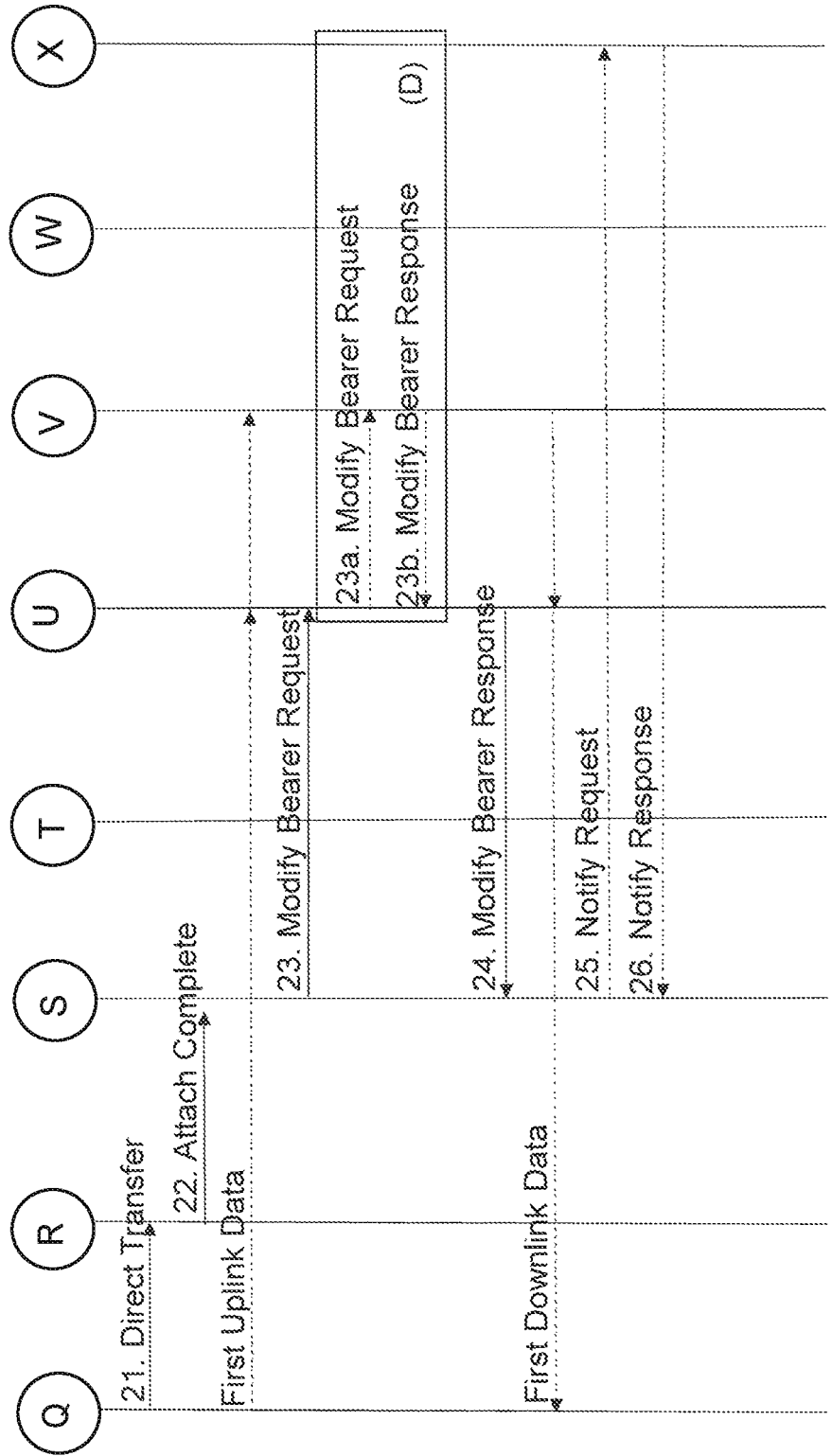

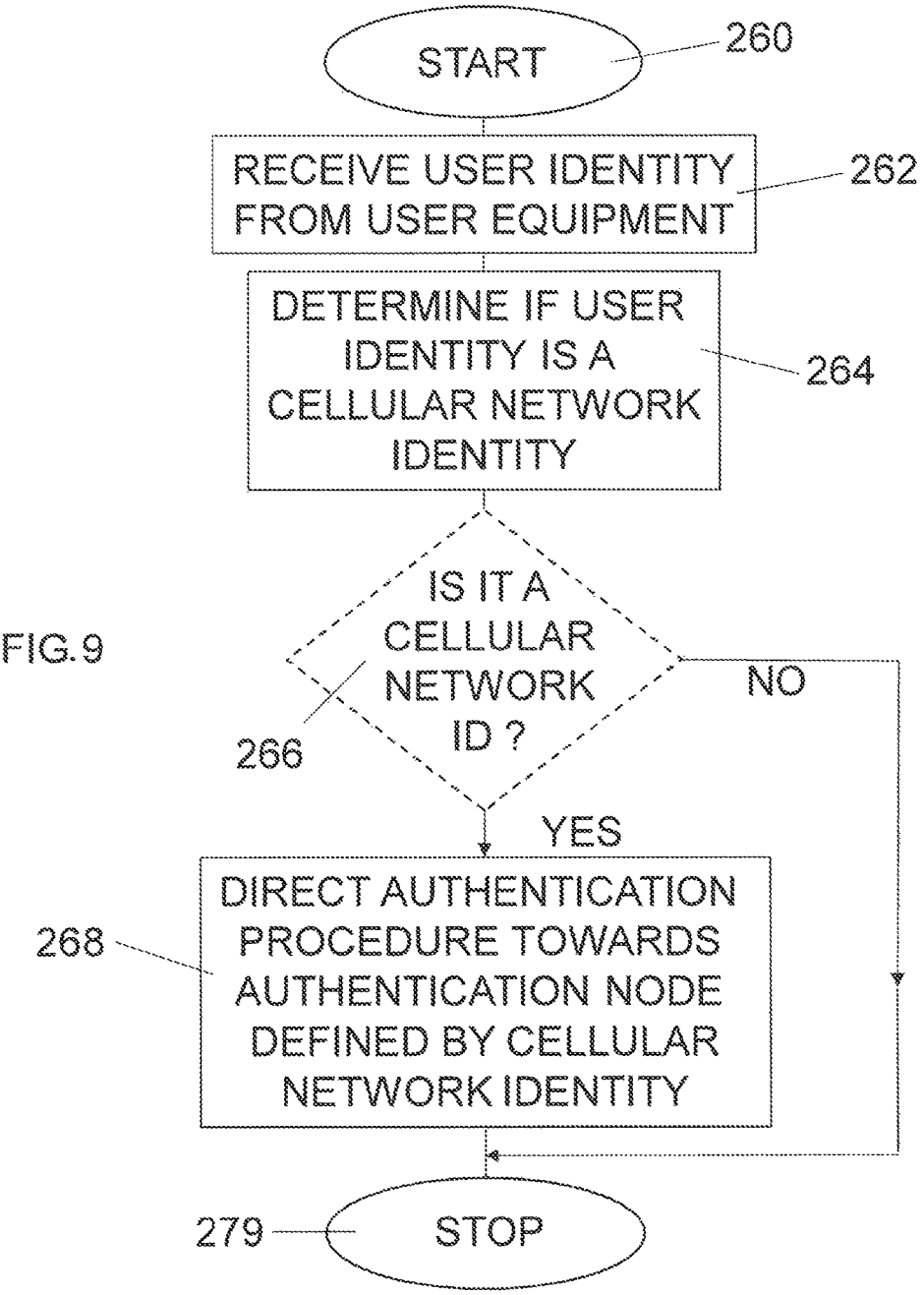

METHODS AND ARRANGEMENTS FOR IDENTIFICATION OF USER EQUIPMENTS FOR AUTHENTICATION PURPOSES

TECHNICAL FIELD

The proposed technology generally relates to attachment of user equipment to cellular networks and wireless local area networks, and in particular to the process of authentication.

BACKGROUND

Mobile operators are today mainly using Wi-Fi to offload traffic from the mobile networks but the opportunity to improve end user experience regarding performance is also becoming more important. The current Wi-Fi deployments are mainly totally separate from mobile networks, and are to be seen as non-integrated. The usage of Wi-Fi is mainly driven due to the free and wide unlicensed spectrum, and the increased availability of Wi-Fi in mobile terminals like smartphones and tablets. The end users are also becoming more and more at ease with using Wi-Fi for example at offices and homes.

The different business segments for Wi-Fi regarding integration possibilities can be divided into mobile operator hosted/controlled vs. 3rd party hosted/controlled Wi-Fi Access Points (Aps) (here 3rd party is seen as anything else than mobile operator and that the 3rd party is not totally "trusted" by the mobile operator. 3rd party could be for example a Wi-Fi operator or an end-user him/herself.). In both segments there exist public/hotspot, enterprise and residential deployments.

Wi-Fi integration towards the mobile core network is emerging as a good way to improve the end user experience further. These solutions consist mainly of the components: common authentication between 3GPP (3rd Generation Partnership Project) and Wi-Fi, and integration of Wi-Fi user plane traffic to the mobile core network. The common authentication is based on automatic Subscriber Identity Module (SIM) based authentication in both access types. The Wi-Fi user plane integration provides the mobile operator the opportunity to provide the same services, like parental control and subscription based payment methods, for the end users when connected both via 3GPP and via Wi-Fi. Different solutions are standardized in 3GPP: Overlay solutions (S2b, S2c) are specified since 3GPP Rel-8 while integration solutions (S2a) are currently work-in-progress (S2a, S2b, S2c indicating the 3GPP interface/reference point name towards the PDN-gateway (GW)). These solutions are specified in 3GPP TS 23.402.

Most solutions of today require extensive signaling to a common authentication node, requiring resources and being a potential security risk.

SUMMARY

It is an object to provide methods and arrangements providing a more coordinated authentication process between wireless local area networks and cellular networks.

This and other objects are met by embodiments of the proposed technology.

According to a first aspect, there is provided a method for assigning a cellular network identity. The method comprises identifying, by a network node of a communication network as a response to an attach message from a user equipment, a user equipment context of the user equipment and in what cellular network node the user equipment is or is going to be attached. A unique representation of the identified user equipment context and the cellular network node is generated. The unique representation is labelled as a cellular network identity, wherein the cellular network identity is a pseudonym identity or a fast re-authentication identity. The unique representation is sent to the user equipment as the pseudonym identity or the fast re-authentication identity.

According to a second aspect, there is provided a method for assigning a cellular network identity. The method comprises receiving, in a user equipment capable to attach to a cellular network and a wireless local area network, a unique representation of a user equipment context of the user equipment and in what cellular network node the user equipment is or is going to be attached, from a network node. The unique representation is labelled as a cellular network identity and the cellular network identity is stored as a pseudonym identity and/or a fast re-authentication identity in a memory in the user equipment.

According to a third aspect, there is provided a method for identifying a user equipment upon attaching the user equipment to a wireless communication network. The method comprises retrieving, from a memory in the user equipment, a unique representation of a user equipment context of the user equipment and in what cellular network node the user equipment is or is going to be attached. The unique representation is labelled as a cellular network identity, wherein the cellular network identity is a pseudonym identity or a fast re-authentication identity. A cellular network identity comprising the unique representation as a user identity is sent in an attach procedure to the wireless communication network.

According to a fourth aspect, there is provided a method for assisting in attaching a user equipment to a wireless communication network. The method comprises receiving, in a network node, of a user identity from a user equipment. The method further comprises a determination of whether or not the received user identity is a cellular network identity, wherein the cellular network identity is a pseudonym identity or a fast re-authentication identity comprising a unique representation of a user equipment context of the user equipment and in what cellular network node the user equipment is or is going to be attached. If it is determined that the received user identity is a cellular network identity, an authentication procedure is directed towards an authentication node defined by the cellular network identity.

According to a fifth aspect, there is provided a network node of a communication network. The network node comprises an input, a processor, a memory and an output. The memory comprising instructions executable by the processor whereby the network node is operative to identify, as a response to an attach message from a user equipment, a user equipment context of the user equipment and in what cellular network node the user equipment is or is going to be attached. The memory comprises further instructions executable by the processor whereby the network node is operative to generate a unique representation of the identified user equipment context and the cellular network node. The memory comprises further instructions executable by the processor whereby the network node is operative to label the unique representation as a cellular network identity, wherein the cellular network identity is a pseudonym identity or a fast re-authentication identity. The memory comprises further instructions executable by the processor whereby the network node is operative to send the unique representation as the pseudonym identity or the fast re-authentication identity via the output to the user equipment.

According to a sixth aspect, there is provided a network node of a communication network. The network node comprises an input, a processor, a memory and an output. The memory comprising instructions executable by the processor whereby the network node is operative to receive a user identity from a user equipment via the input. The memory comprises further instructions executable by the processor whereby the network node is operative to determine whether or not the received user identity is a cellular network identity, wherein the cellular network identity is a pseudonym identity or a fast re-authentication identity comprising a unique representation of a user equipment context of the user equipment and in what cellular network node the user equipment is or is going to be attached. The memory comprises further instructions executable by the processor whereby the network node is operative to direct, if determined that the received user identity is a cellular network identity, an authentication procedure towards an authentication node defined by the cellular network identity.

According to a seventh aspect, there is provided a user equipment capable to attach to a cellular network and a wireless local area network. The user equipment comprises an input, a processor and a memory. The memory comprises instructions executable by the processor whereby the user equipment is operative to receive, from a network node via the input, a unique representation of a user equipment context of the user equipment and in what cellular network node the user equipment is or is going to be attached. The memory comprises further instructions executable by the processor whereby the user equipment is operative to label the unique representation as a cellular network identity. The memory comprises further instructions executable by the processor whereby the user equipment is operative to store the cellular network identity as a pseudonym identity and/or a fast re-authentication identity in the memory.

According to an eighth aspect, there is provided a user equipment capable to attach to a cellular network and a wireless local area network. The user equipment comprises a processor, a memory and an output. The memory comprises instructions executable by the processor whereby the user equipment is operative to retrieve, from the memory, a unique representation of a user equipment context of the equipment and in what cellular network node the user equipment is or is going to be attached. The memory comprises further instructions executable by the processor whereby the user equipment is operative to label the unique representation as a cellular network identity, wherein the cellular network identity is a pseudonym identity or a fast re-authentication identity, and to send, via the output, a cellular network identity comprising the unique representation as a user identity in an attach procedure to the wireless communication network.

According to a ninth aspect, there is provided a network node in a wireless communication network. The network node comprises an identifying module for identifying, as a response to an attach message from a user equipment, a user equipment context of the user equipment and in what cellular network node the user equipment is or is going to be attached. The network node further comprises a generating module for generating a unique representation of the identified user equipment context and the cellular network node. The network node further comprises a labelling module for labelling the unique representation as a cellular network identity, wherein the cellular network identity is a pseudonym identity or a fast re-authentication identity. The network node further comprises a sending module for sending the unique representation to the user equipment as the pseudonym identity or the fast re-authentication identity.

According to a tenth aspect, there is provided a user equipment capable to attach to a cellular network and a wireless local area network. The user equipment comprises a receiving module for receiving a unique representation of a user equipment context of the user equipment and in what cellular network node the user equipment is or is going to be attached, from a network node. The user equipment further comprises a labelling module for labelling the unique representation as a cellular network identity. The user equipment further comprises a memory. The user equipment further comprises a storing module for storing the cellular network identity as a pseudonym identity and/or a fast re-authentication identity in the memory.

According to an eleventh aspect, there is provided a user equipment capable to attach to a cellular network and a wireless local area network. The user equipment comprises a memory. The user equipment further comprises a retrieving module for retrieving, from the memory, a unique representation of a user equipment context of the user equipment and in what cellular network node the user equipment is or is going to be attached. The user equipment further comprises a labelling module for labelling the unique representation as a cellular network identity, wherein the cellular network identity is a pseudonym identity or a fast re-authentication identity. The user equipment further comprises a sending module for sending a cellular network identity comprising the unique representation as a user identity in an attach procedure to the wireless communication network.

According to a twelfth aspect, there is provided a network node in a wireless communication network. The network node comprises a receiving module for receiving a user identity from a user equipment. The network node further comprises a determining module for determining whether or not the received user identity is a cellular network identity, wherein the cellular network identity is a pseudonym identity or a fast re-authentication identity comprising a unique representation of a user equipment context of the user equipment and in what cellular network node the user equipment is or is going to be attached. The network node further comprises a directing module for directing, if determined that the received user identity is a cellular network identity, an authentication procedure towards an authentication node defined by the cellular network identity.

According to a thirteenth aspect, there is provided a computer program, residing in a memory. The computer program comprises program code, which when executed by a processing circuitry causes the processing circuitry to identify, as a response to an attach message from a user equipment, a user equipment context of the user equipment and in what cellular network node the user equipment is or is going to be attached. The computer program further comprises program code, which when executed by the processing circuitry causes the processing circuitry to generate a unique representation of the identified user equipment context and the cellular network node. The computer program further comprises program code, which when executed by the processing circuitry causes the processing circuitry to label the unique representation as a cellular network identity, wherein the cellular network identity is a pseudonym identity and/or a fast re-authentication identity. The computer program further comprises program code, which when executed by the processing circuitry causes the processing circuitry to send the unique representation via an output to the user equipment as the pseudonym identity or the fast re-authentication identity.

According to a thirteenth aspect, there is provided a computer program, residing in a memory. The computer program comprises program code, which when executed by a processing circuitry causes the processing circuitry to receive, from a network node via an input, a unique representation of a user equipment context of the user equipment and in what cellular network node the user equipment is or is going to be attached. The computer program further comprises program code, which when executed by the processing circuitry causes the processing circuitry to label the unique representation as a cellular network identity. The computer program further comprises program code, which when executed by the processing circuitry causes the processing circuitry to store the cellular network identity as a pseudonym identity and/or a fast re-authentication identity in the memory.

According to a fourteenth aspect, there is provided a computer program, residing in a memory. The computer program comprises program code, which when executed by a processing circuitry causes the processing circuitry to retrieve, from the memory, a unique representation of a user equipment context of the user equipment and in what cellular network node the user equipment is or is going to be attached. The computer program further comprises program code, which when executed by the processing circuitry causes the processing circuitry to label the unique representation as a cellular network identity, wherein the cellular network identity is a pseudonym identity or a fast re-authentication identity. The computer program further comprises program code, which when executed by the processing circuitry causes the processing circuitry to send, via an output, a cellular network identity comprising the unique representation as a user identity in an attach procedure to the wireless communication network.

According to a fifteenth aspect, there is provided a computer program, residing in a memory. The computer program comprises program code, which when executed by a processing circuitry causes the processing circuitry to identify, as a response to an attach message from a user equipment, a user equipment context of the user equipment and in what cellular network node the user equipment is or is going to be attached. The computer program further comprises program code, which when executed by the processing circuitry causes the processing circuitry to generate a unique representation of the identified user equipment context and the cellular network node. The computer program further comprises program code, which when executed by the processing circuitry causes the processing circuitry to label the unique representation as a cellular network identity, wherein the cellular network identity is a pseudonym identity and/or a fast re-authentication identity. The computer program further comprises program code, which when executed by the processing circuitry causes the processing circuitry to send the unique representation via an output to the user equipment.

According to a sixteenth aspect, there is provided a computer program, residing in a memory. The computer program comprises program code, which when executed by a processing circuitry causes the processing circuitry to receive a user identity from a user equipment via an input. The computer program further comprises program code, which when executed by the processing circuitry causes the processing circuitry to determine whether or not the received user identity is a cellular network identity, wherein the cellular network identity is a pseudonym identity or a fast re-authentication identity comprising a unique representation of a user equipment context of the user equipment and in what cellular network node the user equipment is or is going to be attached. The computer program further comprises program code, which when executed by the processing circuitry causes the processing circuitry to direct, if determined that the received user identity is a cellular network identity, an authentication procedure towards an authentication node defined by the cellular network identity.

According to a seventeenth aspect, there is provided a computer program product. The computer program comprises program code, which when executed by a processing circuitry causes the processing circuitry to identify, as a response to an attach message from a user equipment, a user equipment context of the user equipment and in what cellular network node the user equipment is or is going to be attached. The computer program further comprises program code, which when executed by a processing circuitry causes the processing circuitry to generate a unique representation of the identified user equipment context and the cellular network node. The computer program further comprises program code, which when executed by a processing circuitry causes the processing circuitry to label the unique representation as a cellular network identity, wherein the cellular network identity is a pseudonym identity or a fast re-authentication identity. The computer program further comprises program code, which when executed by a processing circuitry causes the processing circuitry to send the unique representation as the pseudonym identity or the fast re-authentication identity via an output to the user equipment.

According to an eighteenth aspect, there is provided a computer program product comprising a computer-readable medium on which a computer program is stored. The computer program comprises program code, which when executed by a processing circuitry causes the processing circuitry to receive, from a network node via an input, a unique representation of a user equipment context of the user equipment and in what cellular network node the user equipment is or is going to be attached. The computer program further comprises program code, which when executed by a processing circuitry causes the processing circuitry to label the unique representation as a cellular network identity. The computer program further comprises program code, which when executed by a processing circuitry causes the processing circuitry to store the cellular network identity as a pseudonym identity and/or a fast re-authentication identity in a memory.

According to a nineteenth aspect, there is provided a computer program product comprising a computer-readable medium on which a computer program is stored. The computer program comprises program code, which when executed by a processing circuitry causes the processing circuitry to retrieve, from a memory, a unique representation of a user equipment context of the user equipment and in what cellular network node the user equipment is or is going to be attached. The computer program further comprises program code, which when executed by a processing circuitry causes the processing circuitry to label the unique representation as a cellular network identity, wherein the cellular network identity is a pseudonym identity or a fast re-authentication identity. The computer program further comprises program code, which when executed by a processing circuitry causes the processing circuitry to send, via an output, a cellular network identity comprising the unique representation as a user identity in an attach procedure to the wireless communication network.

According to a twentieth aspect, there is provided a computer program product comprising a computer-readable medium on which a computer program is stored. The computer program comprises program code, which when executed by a processing circuitry causes the processing circuitry to receive a user identity from a user equipment via an input. The computer program further comprises program code, which when executed by a processing circuitry causes the processing circuitry to determine whether or not the received user identity is a cellular network identity, wherein the cellular network identity is a pseudonym identity or a fast re-authentication identity comprising a unique representation of a user equipment context of the user equipment and in what cellular network node the user equipment is or is going to be attached. The computer program further comprises program code, which when executed by a processing circuitry causes the processing circuitry to direct, if determined that the received user identity is a cellular network identity, an authentication procedure towards an authentication node defined by the cellular network identity.

Embodiments of the proposed technology enables/makes it possible to coordinate features between cellular network and non-cellular network access, e.g. 3GPP and non-3GPP access (e.g. WiFi access).

The solution will work with minimal to none standard changes meaning that this solution can be launched in a product quite easily. There might still be some UE impact.

Additionally there is no need with the proposed technology to introduce new databases to map users between the accesses.

Lastly, because it is e.g. the SGSN/MME (Serving General packet radio services Support Node/Mobility Management Entity) identity that is stored in the UE 3GPP identity, the 3GPP identity can be semi-static and only have to be changed in the case when UE is move from one SGSN/MME to another which is done quite seldom Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIGS. 6A-6D illustrate the E-UTRAN Initial Attach procedure;

FIG. 9 illustrates a flow diagram of steps of an embodiment of a method for assisting in attaching a user equipment to a wireless communication network

DETAILED DESCRIPTION

Throughout the drawings, the same reference designations are used for similar or corresponding elements.

For a better understanding of the proposed technology, it may be useful to begin with a brief overview of integration of wireless local area networks into mobile core networks of today.

WiFi networks and 3GPP cellular networks are in the present disclosure used as non-limiting exemplifying systems. However, it is emphasized that any type of wireless local area network can be integrated with any type of cellular network according to the same basic principles.

As used herein, the non-limiting terms "mobile station", "User Equipment" and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the terms "UE" and "STA" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like. The term "network node" may in a similar way also refer to an access point, a Trusted WLAN Access Gateway (TWAG) or an Evolved Packet Data Gateway (ePDG) in a wireless local area network.

The UE and network node may also include radio circuitry for communication with one or more other nodes, including transmitting and/or receiving information.

Figure 1A:
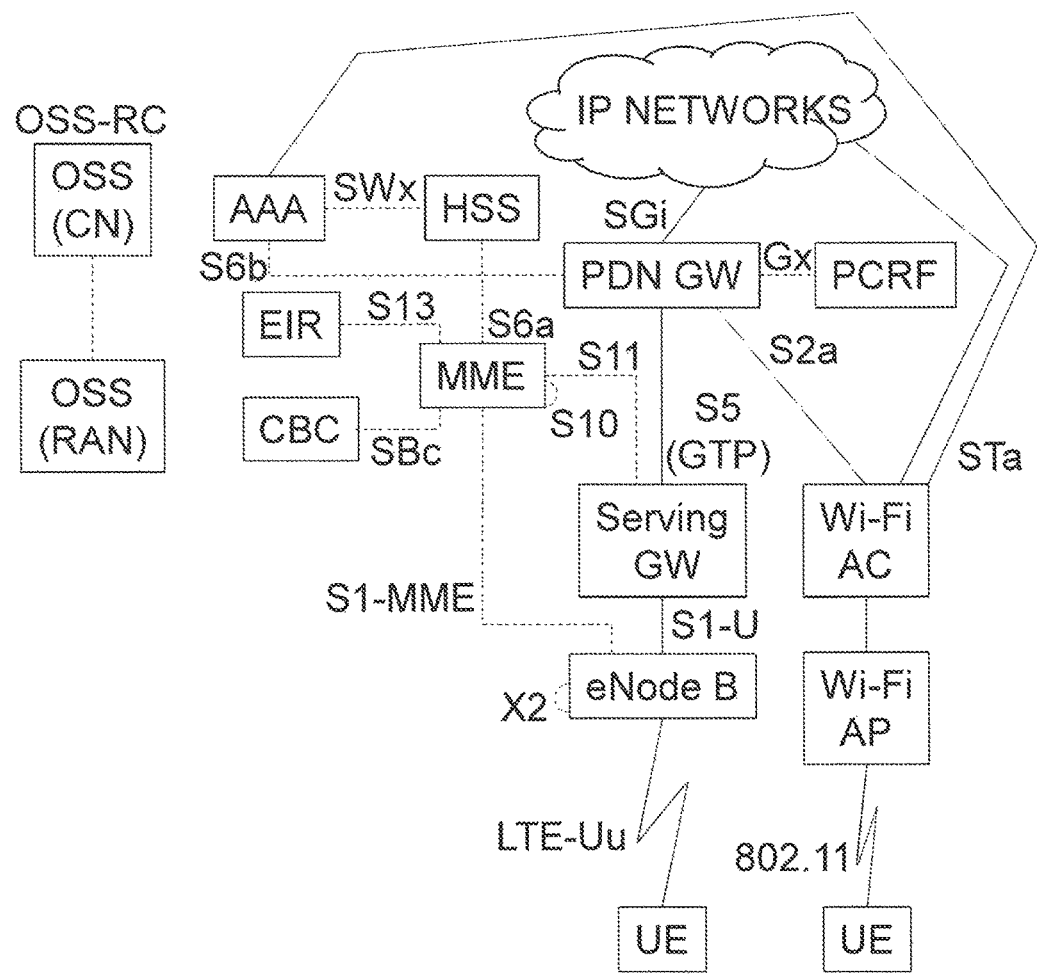
FIG. 1A is an illustration of the existing network architectures for Evolved Universal Terrestrial Radio Access Network/Evolved Packet Core (E-UTRAN/EPC) and S2a integration.

FIG. 1A shows the network architecture for E-UTRAN and EPC and how the eNodeB is connected via the S1-interfaces, S1-MME and S1-U to the MME and Serving GW respectively. It also shows how the Wi-Fi access network is connected to the PDN-GW via the S2a interface (that is trusted WiFi access) and to the 3GPP AAA Server via the STa interface.

It should be noted that the configuration of the Wi-Fi network shown in FIG. 1 is only an illustrative example and that the Wi-Fi network may be configured or arranged in several other ways and may comprise several further network nodes or entities. For example, the Wi-Fi network may also include a Broadband Network Gateway (BNG). In another example, the Wi-Fi AP may be co-located with a Residential Gateway (RG). In a further example, the Wi-Fi network may also comprise a Trusted WLAN Access Gateway (TWAG). In addition, the interface between the Wi-Fi AC and the PDN GW, i.e. the S2a interface, may also be implemented between the PDN GW and for example either the BNG or the RG.

Figure 1B:
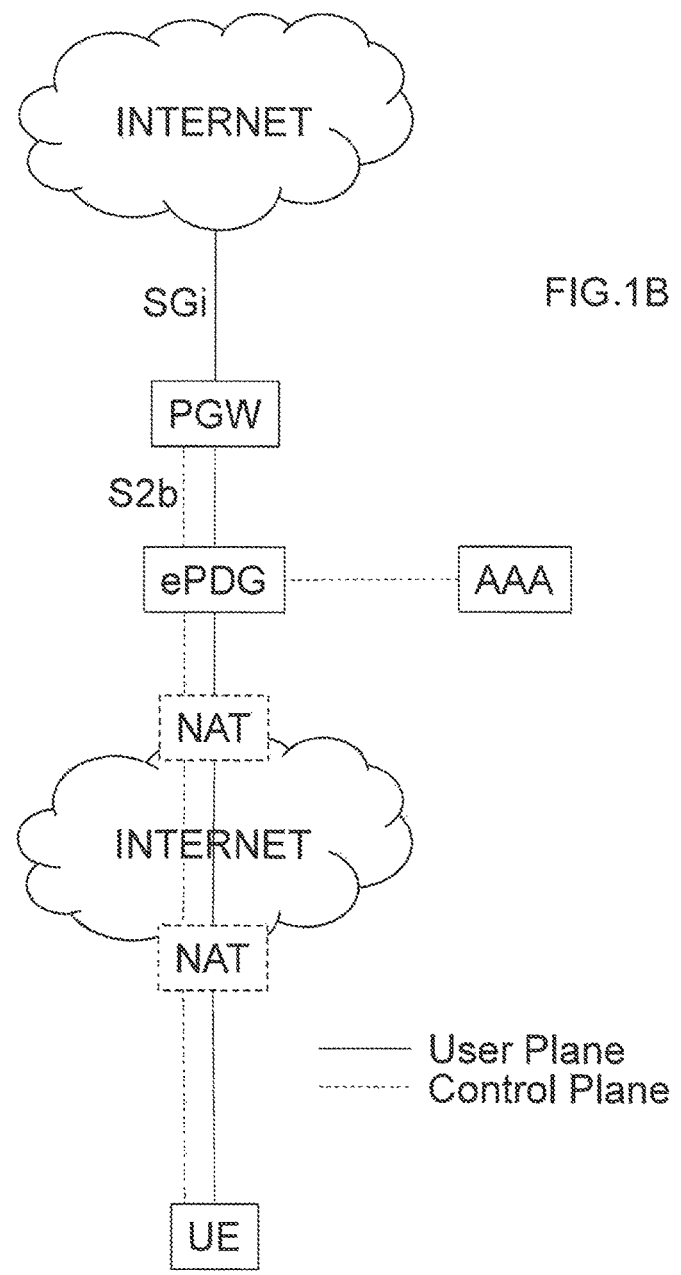
FIG. 1B is an illustration of a typical deployment for untrusted WiFi access.

Untrusted WiFi solution, as illustrated in FIG. 1B, is an overlay solution where IKEv2 and IPsec is used between the UE an EPDG and then the EPDG is connected to AAA (and further on to HSS) for authentication and to PGW via S2b for connectivity. With this solution it is also possible to have automatic authentication using EAP-AKA.

Figure 2A:
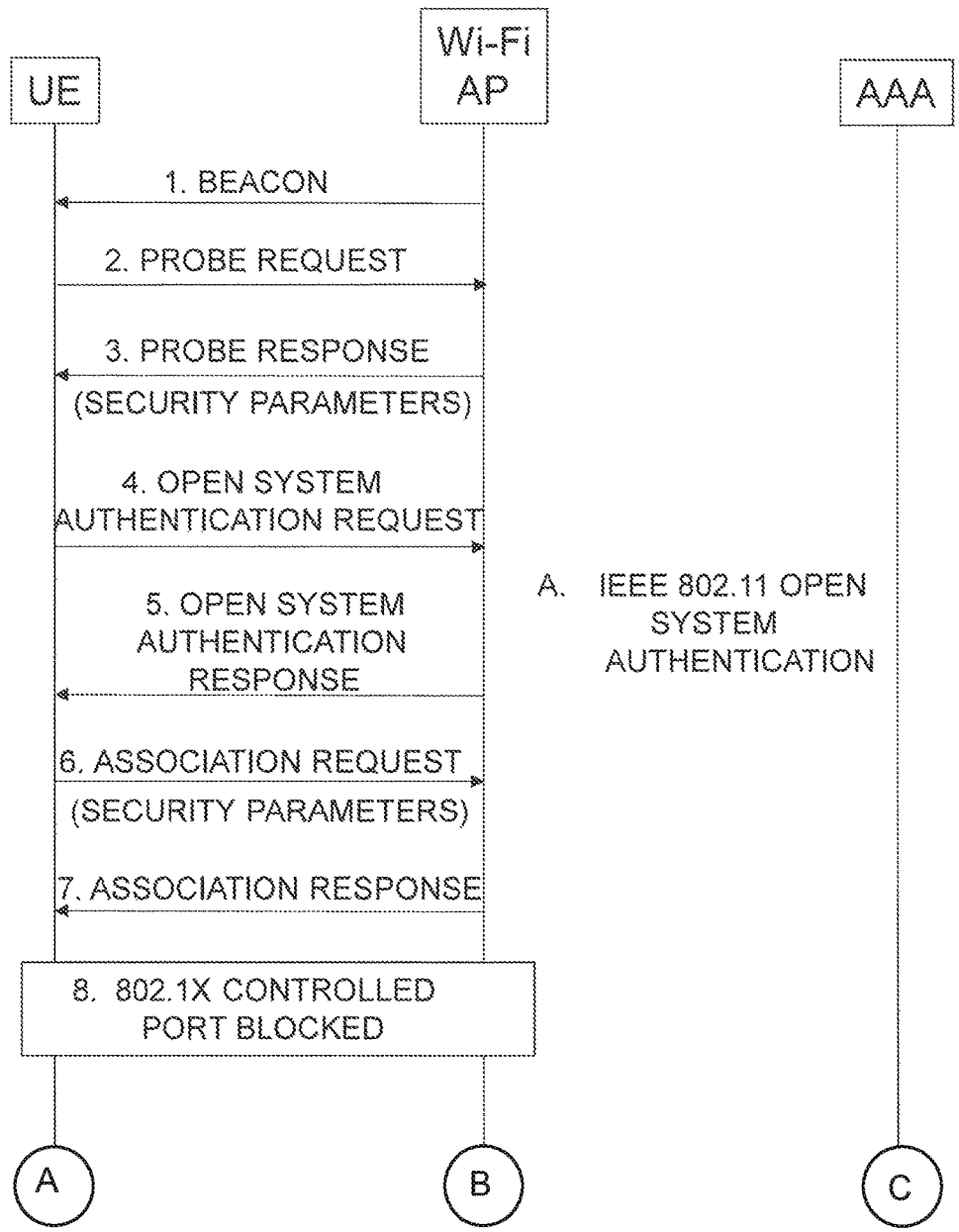
FIGS. 2A-C illustrate a process flow of Wireless Local Area Network (WLAN) Retransmission Sequence Number (RSN) authentication (with EAP-SIM)
Figure 2B:
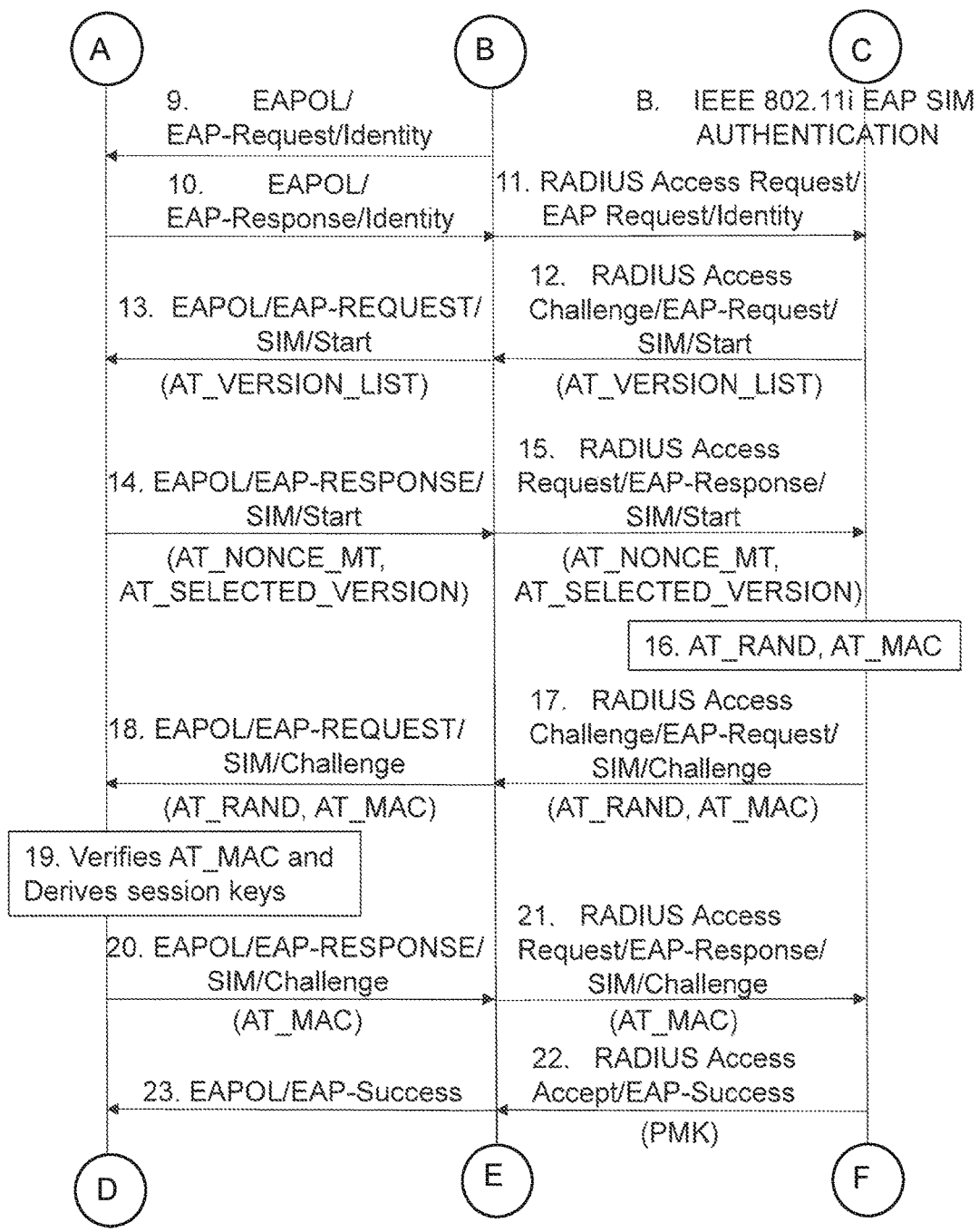
Figure 2C:
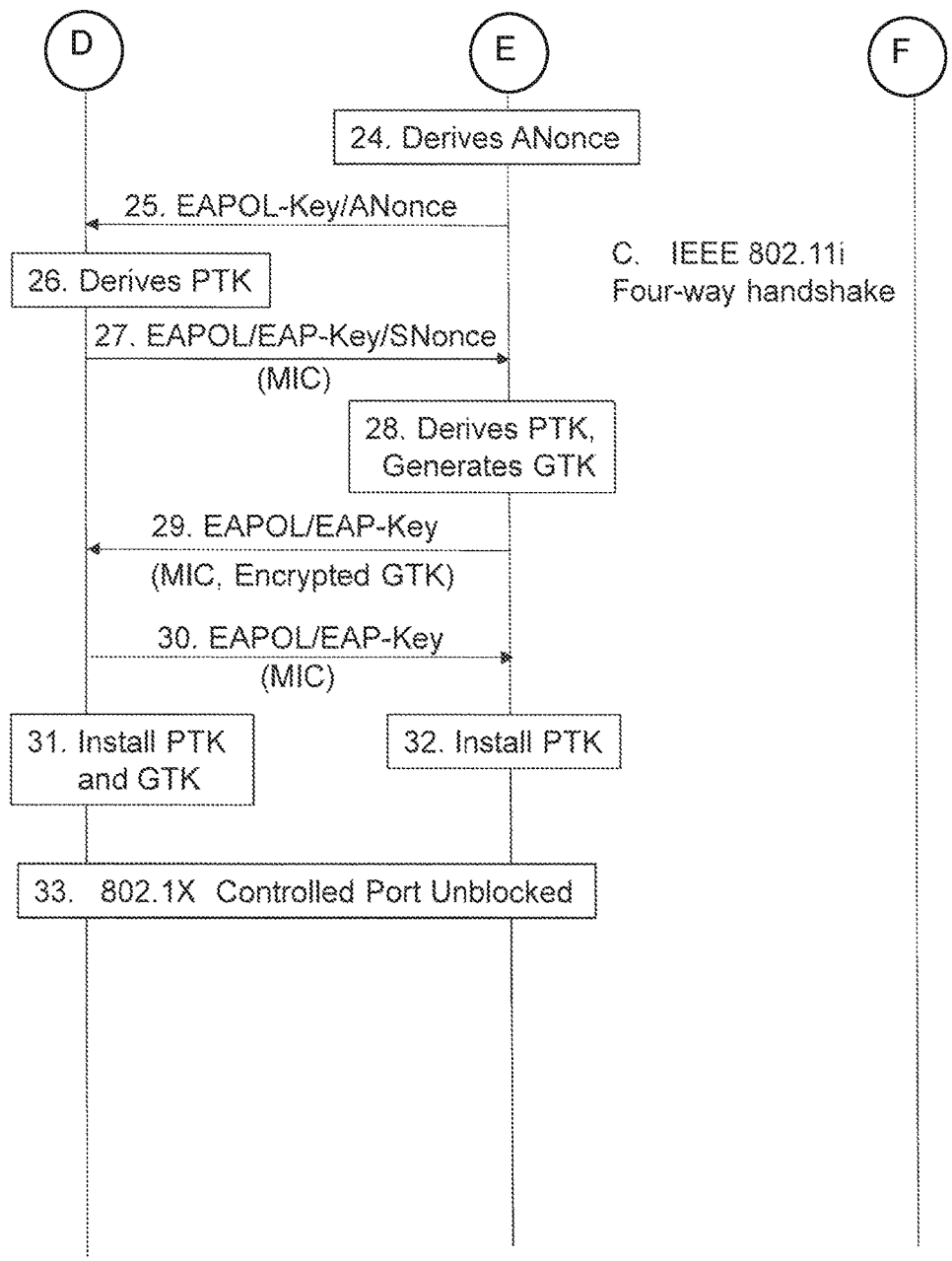

The connection procedure for a STA to a WLAN is depicted in FIG. 2. In this case Radius is used between WiFi network and AAA but according to standard Diameter is used but it is not very common in current products. For the presently presented ideas it is not important if Radius or Diameter is in use.

The authentication procedure comprises the following steps:

1 The Station (STA) receives a Beacon frame revealing (among other parameters) the security features associated with the Extended Service Set (ESS) the AP belongs to. The format of the beacon frame as well as all the information elements it carries are described in Chapter 8.3.3.2 of IEEE 802.11;
2 If the STA does not receive a Beacon frame for some reason, it can generate a Probe Request and send it to the AP. This procedure is called active scanning and by performing it, the STA can receive from the AP the same information as it would have from a Beacon message. The Probe Request frame is described in Chapter 8.3.3.9 of IEEE 802.11;
3 The AP answers with Probe Response—IEEE 802.11, Chapter 8.3.3.10;
a NOTE: The discovery procedure consists of either step 1 or steps 2 and 3 (i.e., receiving a Beacon frame and exchanging probe messages are mutually exclusive);
4 The STA sends an Open System Authentication Request as defined in Chapter 11.2.3.2 of IEEE 802.11;
5 The AP responds with an Open System Authentication Response;
6 The STA then sends an Association Request, indicating the security parameters to be used later;
7 The AP responds with an Association Response
a NOTE: The Open System Authentication does not provide any security. The connection between the STA and the AP is secured at a later point, by means of Authentication and Key Agreement procedure. Nevertheless, a possible attack altering the security parameters in the Open System Authentication message exchange will be detected at the stage of key derivation;
8 At this point the Open System Authentication is completed and the STA can communicate only with the AP—the rest of the traffic is blocked by the port-based network control (PBNC) enforcer, as defined in IEEE 802.1X. Some of the traffic towards external hosts, however, can be forwarded by the AP, as in the case of the communication with the RADIUS server;
9 This step is the first step of the EAP-SIM authentication RFC 4186. The AP encapsulates an EAP-Request of Type 18 (SIM) inside an EAP over LAN (EAPOL) frame, asking the STA to report its identity. In the case when the STA is equipped with a SIM, the identity is the International Mobile Subscriber Identity (IMSI), followed by the "@" sign and the home realm. It is also possible for the STA to include an additional "1" in front of the IMSI in order to indicate preference for the exclusive use of EAP-SIM if other EAP methods are available (e.g., EAP-AKAe). This identity can also be a pseudonym/fast re-authentication identity received at an earlier authentication procedure and then it is not possible to extract IMSI from this identity;
10 The STA responds with its identity. An example of such is: 1234580123000100@wlan.mnc048. mcc264.3gppnetwork.org (and IMSI is in this example 234580123000100 and the preceding "1" indicates the preference to use EAP-SIM);
11 The AP extracts the EAP-Response message, encapsulates it in a RADIUS frame and forwards it to the backend AAA server. The handling of EAP frames over RADIUS is described by the Internet Engineering Task Force (IETF) in RFC 3579;
12 The AAA server recognizes the EAP method and sends an EAP-Request/SIM/Start, indicating that an EAP-SIM procedure has been initiated for that Supplicant. It also includes the list of supported SIM versions in the message as described in Chapter 10.2 of RFC 4186;
13 The AP relays the EAP-Request/SIM/Start message to the STA;
14 The STA responds with EAP-Response/SIM/Start message, which carries a random number (NONCE_MT) carried in the AT_NONCE_MT attribute (a randomly selected number), as well as the selected EAP-SIM version (AT_SELECTED_VERSION);
15 The AP forwards the EAP-Response/SIM/Start to the AAA server;
16 The AAA server obtains the Global System for Mobile communications (GSM) triplet (Random number (RAND), Signal Response (SRES) and Kc) from the Home Location Register/Authentication Centre (HLR/AuC) and derives the keying material as specified in Chapter 7 of RFC 4186. The GSM triplet consists of:
a RAND—a 128-bit random number, generated by the Authentication Centre (an entity within the GSM core network, used to authenticate subscribers at the point of initial attach) when a subscriber authentication is requested. Its main use is for the derivation of the Signed Response (SRES) and the Kc;

b SRES—a 32-bit variable, the expected response from the mobile station/STA after it has been challenged with the RAND;

c Kc—a 64-bit ciphering key, used to encipher and decipher data transmitted between the STA and the AP;

17 The AAA generates an EAP-Request/SIM/Challenge message, including RAND challenges and message authentication code attribute (AT_MAC). The AT_MAC derivation is based on the RAND and Kc values;

18 The AP forwards the EAP-Request/SIM/Challenge message to the STA;

19 The STA feeds the received RAND into the GSM algorithms running on the SIM and the output is a copy of the AT_MAC and a SRES value. The first thing for the STA to do is to check whether the AT_MAC value received by the AAA (relayed by the AP) and the one generated by the SIM match. If so the STA continues with the authentication, otherwise it responds with an EAP-Response/SIM/Client-Error message. The second thing is to derive a new AT_MAC, based on the generated SRES;

20 The new AT_MAC is sent to the AAA server (via the AP) in an EAP-Response/SIM/Challenge message;

21 The AP forwards the EAP-Response/SIM/Challenge to the AAA server;

22 The AAA server verifies the new AT_MAC value that the STA has just sent. If the verification is successful, it sends an EAP-Success message to the AP. The message also carries keying material—Pairwise Master Key (PMK). The PMK is intended for the AP only and it is not forwarded to the STA (the STA can derive the same key autonomously since it is based on the Kc, which the SIM in the STA can compute based on the RAND);

23 The AP forwards the EAP-Success message to the STA and stores the PMK for the following Four-way handshake;

24 The AP uses the PMK to generate an Authenticator nonce (ANonce);

25 The ANonce value is sent to the STA in an EAPOL-Key message;

26 Using the received ANonce (together with the SNonce and the PMK), the STA constructs the Pairwise Temporal Key (PTK);

27 The STA sends an EAPOL-Key message to the AP, including a Supplicant nonce (SNonce) and a message integrity code (MIC);

28 The AP uses the ANonce, SNonce and the PMK to construct the PTK. The AP also uses the MIC in order to verify that the STA has computed the correct and fresh key. Furthermore, the AP also generates and installs a Group Temporal Key (GTK, which is used exclusively for the encryption and decryption of broadcast and multicast traffic;

29 The AP sends to the STA an encrypted GTK, a sequence number to use for the next broadcast message and an instruction to install the PTK (the message is integrity protected by another MIC);

30 The STA responds with an acknowledgement message;

31 The STA installs both the PTK and the GTK and as of this point uses them to encrypt and decrypt all communication;

32 The AP also installs the PTK;

33 The 802.1X Controlled Port is now open and the STA can communicate with other network hosts besides the AP.

The current WiFi integration into mobile core is achieved by having separate authentication for WiFi (via 3GPP-AAA and HSS) and then have the UE connected via the PGW using either S2a or S2b. The WiFi network is quite loosely coupled with Mobile Packet Core.

Figure 3:
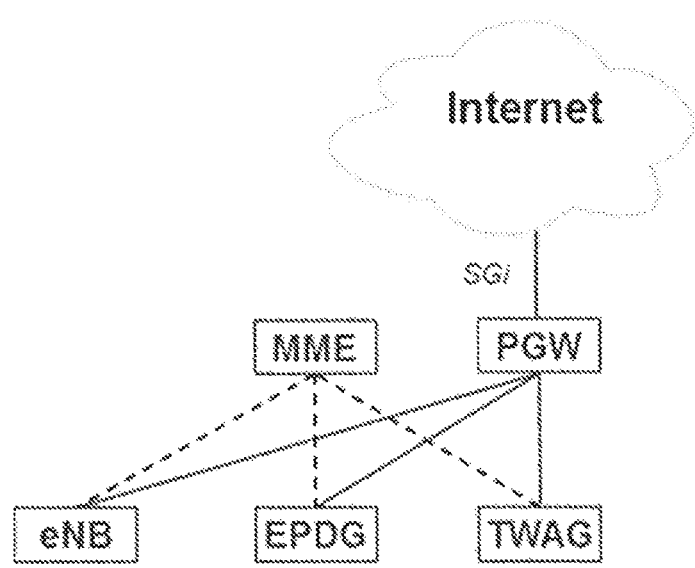
FIG. 3 illustrates how SGSN/MME may do authentication for both trusted and untrusted WiFi access.

It is of interest to use SGSN/MME for combined authentication between 3GPP and WiFi. If the same SGSN/MME that handle authentication for the UE also for 3GPP is used, see FIG. 3, it is possible for the network to coordinate between the accesses and make good decisions. This could for example be that you want the UE to use the access that is "best" based on a number of parameters (e.g., price, user quota, available bandwidth etc.).

If SGSN/MME is used for WiFi authentication, the call-flow will be similar as in FIG. 2 but with SGSN/MME as AAA and the SGSN/MME can coordinate the UEs 3GPP access with the UEs WiFi access.

To be able to use the same SGSN/MME for WiFi authentication as that is used for the UE on the 3GPP side, the SGSN/MME have to be identified when UE connects to WiFi. If SGSN/MME is doing the authentication of the UE, it implies that the correct SGSN/MME have to be found already before step 11 in FIG. 2.

In the existing solution in FIG. 2 the IMSI number can be used in step 10 but in that signal it is not always IMSI being sent but it could also be a pseudonym identity. If so, the AAA can request primary identity (i.e., IMSI) but that require extra signalling and it is also a security issue to send IMSI over the air. Also, the IMSI number is only a permanent identity of the UE and can't directly be used to locate the 3GPP node which holds the UE's subscription and MM context. Then there has to be a function (including database) that maps IMSI to 3GPP node.

Embodiments of the proposed technology comprises an assignment of a cellular network identity, e.g. a 3GPP identity, to the UE which can be used, as e.g. EAP-SIM/AKA identity, when connecting to a wireless local area network, e.g. WiFi. The same identity can both be used for trusted (EAP-SIM/AKA inside EAPoL) and untrusted (EAP-AKA in IKEv2) access.

The identity can be assigned to the UE either when it first attaches to the cellular network, e.g. to the 3GPP network, or when it first attaches to the wireless local area network, e.g. WiFi.

The identity will uniquely identify the UE context and in what cellular network node, e.g. 3GPP node, it is attached (SGSN/MME etc.). One particular example could be that the identity is based on the Global Unique Temporary Identifier (GUTI).

By way of example, context information includes information related to a wireless device for establishing and/or maintaining communication in a wireless communication network. A cellular context of the wireless device includes information for maintaining communication in a cellular radio communication network. A WLAN context of the wireless device includes information for maintaining communication in a WLAN. Context information may for example include state information, security information and/or capability information for a wireless device, and optionally also radio access related information for the wireless device.

In particular, a UE context is a block of information related to UE that includes information useful to maintain communication and/or service in the relevant network, for example UE state information, security information and UE capability information.

The WLAN network node, e.g. the TWAN or ePDG, shall select the authentication node, e.g. the SGSN/MME, based on the cellular network identity, e.g. 3GPP identity, of the UE The solution can in a data flow sense be divided in two parts; How the UE receives the cellular network identity, e.g. the 3GPP identity and How the UE use the cellular network identity, e.g. the 3GPP identity, so the network can find the correct cellular network node, e.g. 3GPP node. However, the parts are intimately associated to each other into one common concept.

Figure 4:
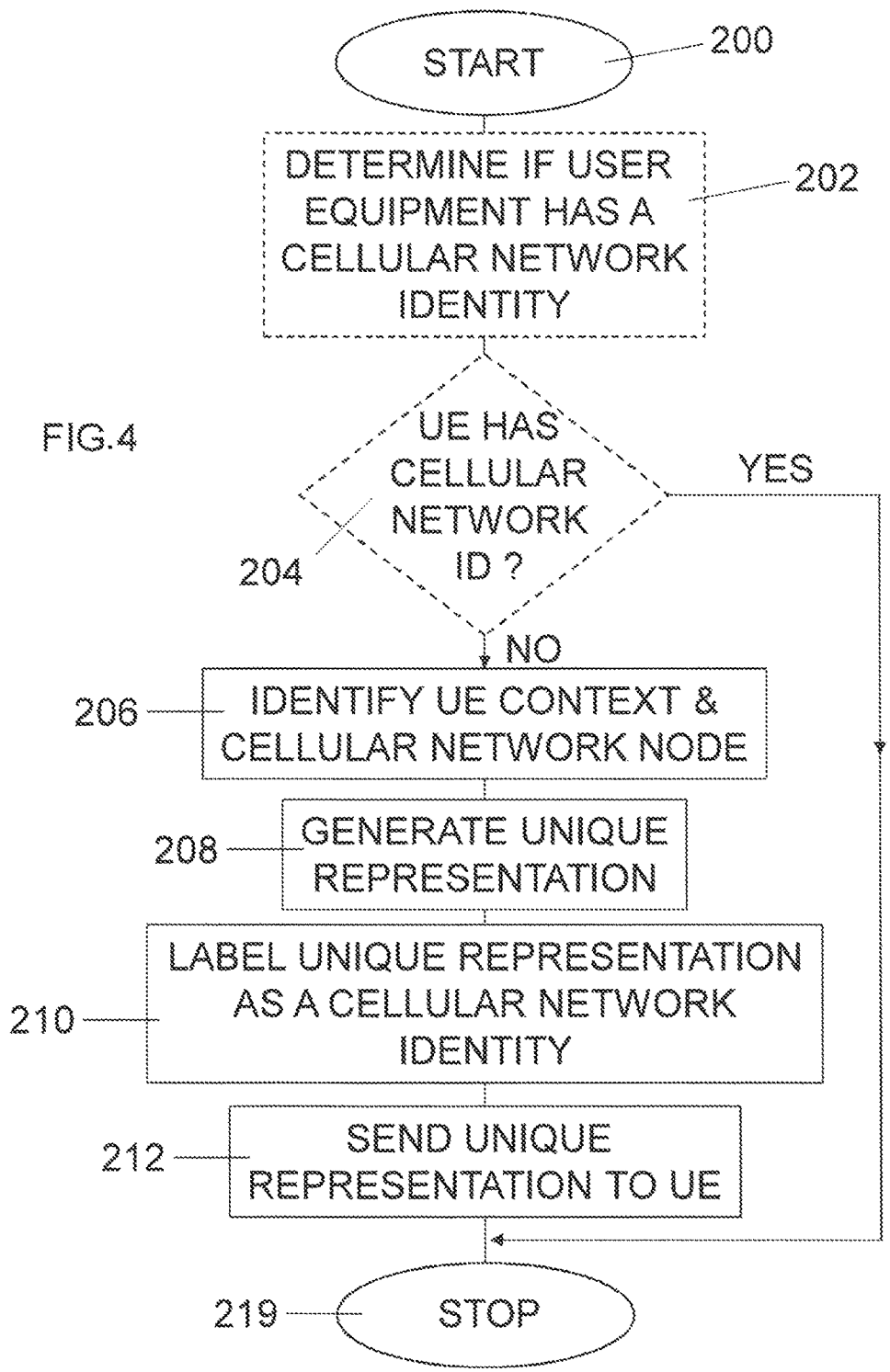
FIG. 4 illustrates a flow diagram of steps of an embodiment of a method in a network node for assigning a cellular network identity.

In one embodiment, a method for assigning a cellular network identity, see FIG. 4, starts in step 200. The method comprises identifying, step 206, a user equipment context of a user equipment and in what cellular network node the user equipment is or is going to be attached. The identifying is performed as a response to an attach message from the user equipment in question. The identifying is performed by a network node of a communication network, possibly in cooperation with other network nodes.

The network node can in one embodiment be a network node of the cellular network associated with the cellular network identity. The requested information for the identifying process is then available in nodes within the cellular network.

The network node can in another embodiment be a network node of a wireless local area network. The requested information for the identifying process then has to be performed in cooperation with the cellular network. This can be achieved in many different ways and is discussed further below.

In a particular embodiment, the method comprises the further step 202 of determining whether or not the user equipment already has an assigned cellular network identity. As illustrated by 204, if the user equipment does not have the cellular network identity assigned already, step 206 is performed, and consequently the steps following on step 206. Otherwise the process ends.

In the embodiment of FIG. 4, the process continues with step 208, in which a unique representation of the identified user equipment context and the cellular network node is generated. In a step 212, the unique representation is sent to the user equipment.

In a step 210, the unique representation is labelled as a cellular network identity before the step 212 of sending to the user equipment. In this embodiment, the entire cellular network identity, i.e. both the unique representation and the label, is sent to the user equipment.

The process ends in step 219.

In a particular embodiment, the wireless local area network is a WiFi network.

In a particular embodiment, the cellular network is a 3GPP cellular network.

Figure 5:
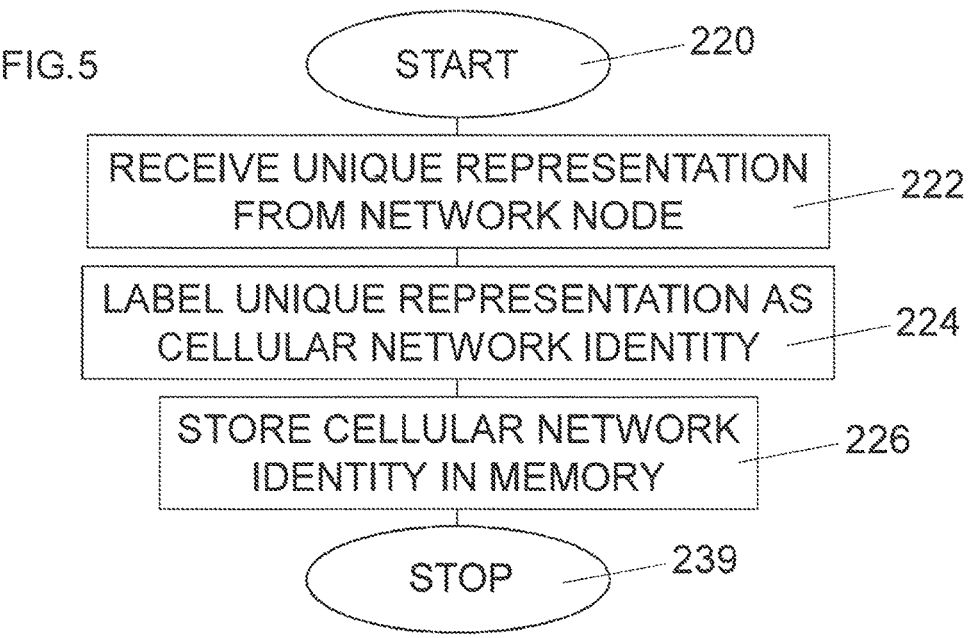
FIG. 5 illustrates a flow diagram of steps of an embodiment of a method in a user equipment for assigning a cellular network identity.

FIG. 5 illustrates a flow diagram of steps of an embodiment of a method for assigning a cellular network identity. The process starts in step 220. In step 222, a unique representation of a user equipment context of a user equipment and in what cellular network node the user equipment is or is going to be attached is received in the user equipment in question. The user equipment is capable to attach to a cellular network and to a wireless local area network. This information is received from a network node, e.g. created by the method illustrated in FIG. 4. The network node may be a network node of the cellular network. The network node may also be a network node of the wireless local area network. In step 224, the unique representation is labelled as a cellular network identity. In particular embodiments where the network node provides the labelling, step 224 may be omitted, since the step then becomes redundant. The cellular network identity is in step 226 stored, in this embodiment as a pseudonym or fast re-authentication identity, in a memory in the user equipment. The process ends in step 239.

In an alternative example, step 224 may be omitted. The unique representation may then be stored in a memory without being labelled as a cellular network identity.

In a particular embodiment, the wireless local area network is a WiFi network.

In a particular embodiment, the cellular network is a 3GPP cellular network.

In other words, two alternatives of the UE to receive the cellular network identity, e.g. the 3GPP identity, exist and both can be used at the same time to complement each other.

Figure 6B:
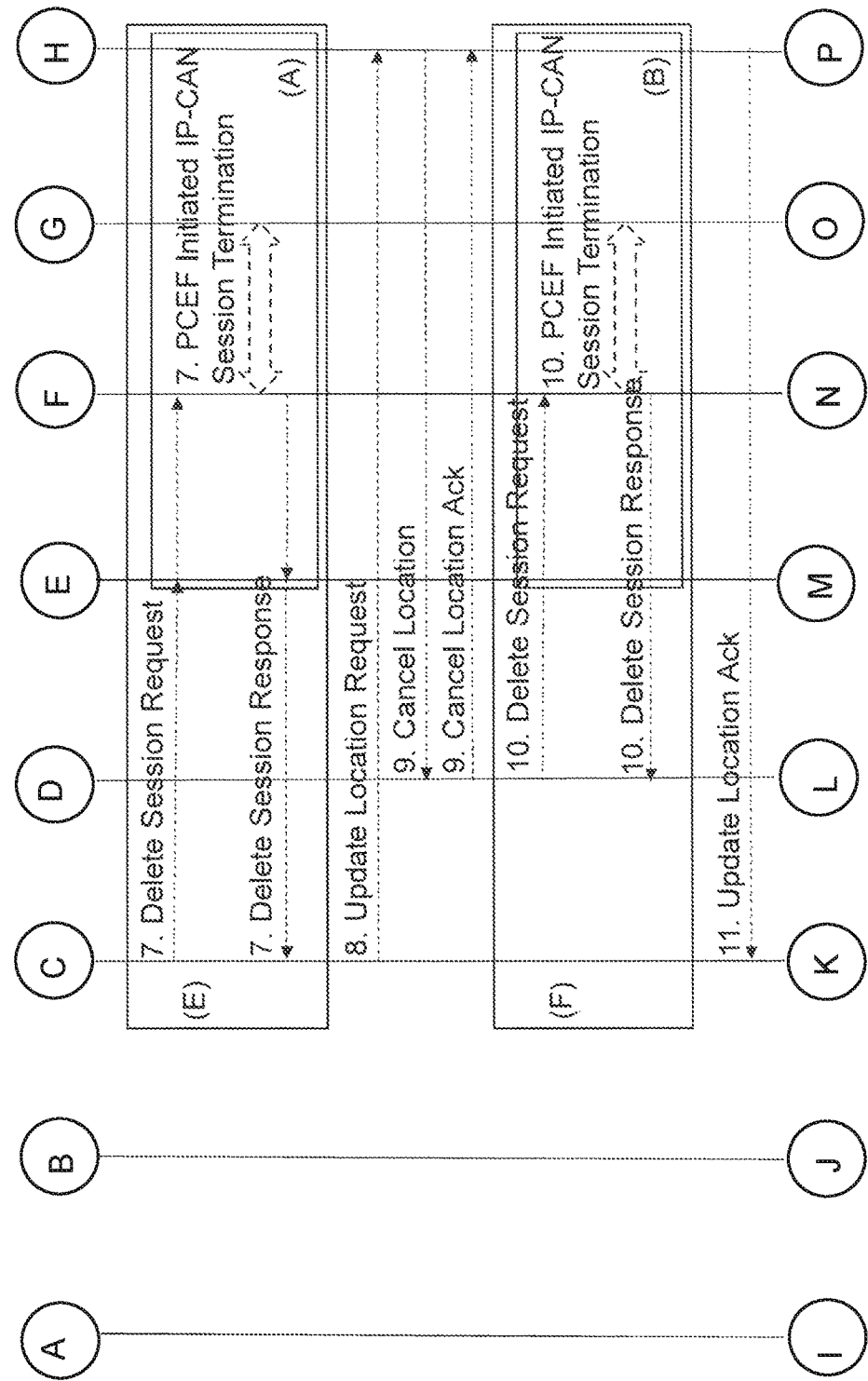
Figure 6C:
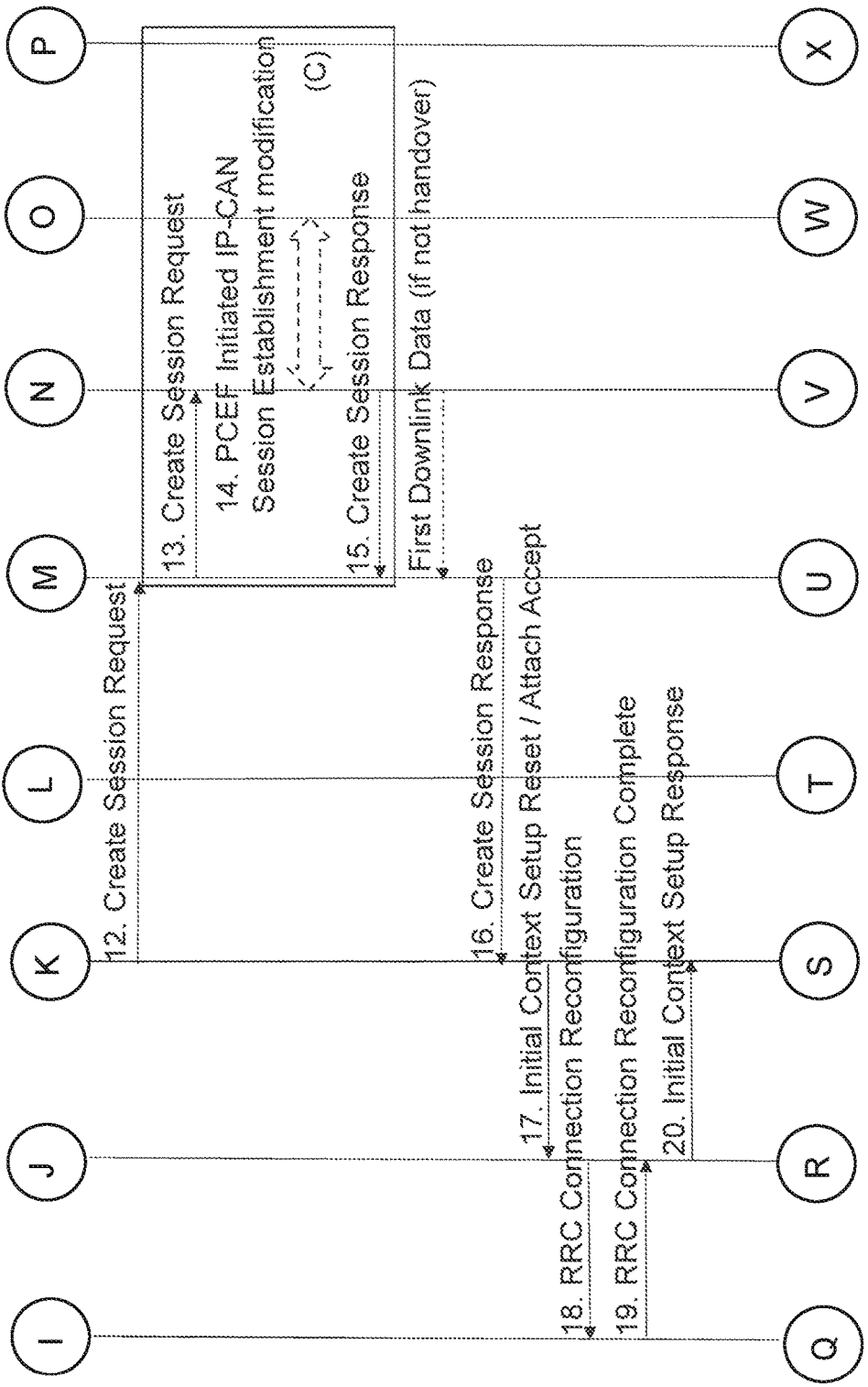

A first solution is that the identity is assigned by a cellular network node, e.g. a 3GPP node, when UE attach to the cellular network, e.g. the 3GPP network. In FIG. 6, the procedure of E-UTRAN initial access is shown and then the MME can assign a temporary UE identity (i.e., GUTI) as for normal attach procedure. The GUTI is typically provided in the Attach Accept step (step 17). UE shall also use the same identity for subsequent non-3GPP access during EAP authentication procedure. This method requires changes in the standard. But such standard changes only changes the UE behaviour, no standard changes are necessary on network side. However, the network side as such also needs to be changed.

The other method of assigning the 3GPP identity is through the first WiFi authentication procedure. Referring to FIG. 2, the 3GPP identity can be sent as pseudonym or fast re-authentication identity in Radius and EAPOL message (number 17 and 18) containing the EAP-Request/SIM/Challenge. The 3GPP identity can also be sent as pseudonym or fast re-authentication identity in Diameter.

RFC4186 specifies:

The server transmits pseudonym usernames and fast re-authentication identities to the peer in cipher, using the AT_ENCR_DATA attribute.

The EAP-Request/SIM/Challenge message MAY include an encrypted pseudonym username and/or an encrypted fast re-authentication identity in the value field of the AT_ENCR_DATA attribute.

For trusted access it is also possible to use EAP-AKA and then the pseudonym and fast re-authentication identity are sent according to RFC4187:

The server transmits pseudonym usernames and fast re-authentication identities to the peer in cipher, using the AT_ENCR_DATA attribute.

The EAP-Request/AKA-Challenge message MAY include an encrypted pseudonym username and/or an encrypted fast re-authentication identity in the value field of the AT_ENCR_DATA attribute. How the network assign 3GPP identity in this solution depend on if the UE is attached to SGSN/MME on 3GPP side or not.

If UE is attached to 3GPP, the network should assign a pseudonym identity and/or fast re-authentication identity that point at the SGSN/MME where the UE context is situated. This could be solved by querying HSS or by broadcasting question to all SGSN/MMEs in the pool. Also other alternatives are possible. However, the exact details of how that is done is outside the scope for this solution, if they only result in an identification of the SGSN/MME where the UE context is situated.

If UE is not attached to 3GPP, the network should select a SGSN/MME for the UE and provide a 3GPP identity as pseudonym identity that point at the selected SGSN/MME. In one embodiment of this invention the UE can then also use this pseudonym identity as GUTI when attaching to 3GPP and then the attach request will directly be served by the correct SGSN/MME (i.e., where the UE is attached using WiFi).

Figure 7:
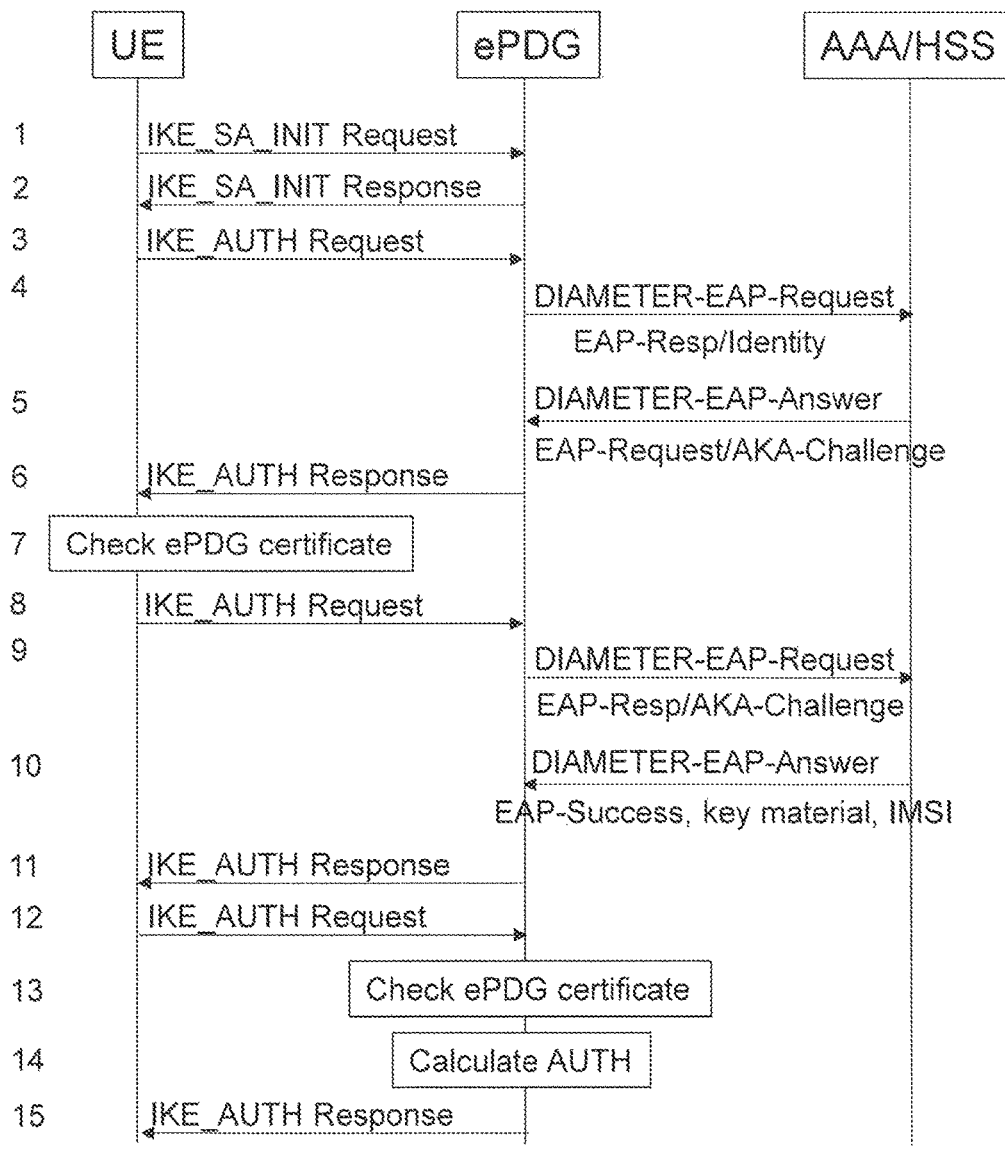
FIG. 7 illustrates an Attach procedure in untrusted access.

For untrusted access, EAP-AKA is always used and this procedure is depicted in FIG. 7. This procedure is very similar to the trusted access case but IKEv2 is used instead of EAPol. It is the same EAP-AKA protocol inside these "bearer" protocols.

Once the user equipment has the cellular network identity stored in a memory, this cellular network identity can be used for attaching to either the cellular network or the wireless local access network.

Figure 8:
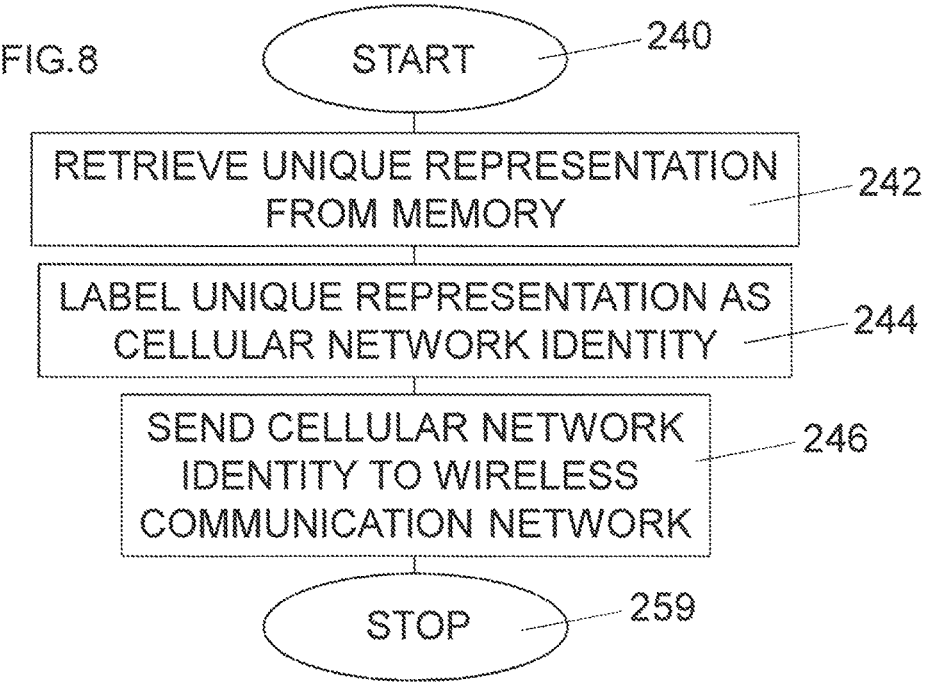
FIG. 8 illustrates a flow diagram of steps of an embodiment of a method in a user equipment for assigning a cellular network identity.

FIG. 8 illustrates a flow diagram of steps of an embodiment of a method for identifying a user equipment upon attaching the user equipment to a wireless communication network. The process starts in step 240. In step 242, a unique representation of a user equipment context of the user equipment and in what cellular network node the user equipment is or is going to be attached is retrieved from a memory in the user equipment.

In particular embodiments, where the unique representation is stored as such, the unique representation is in step 244 labelled as the cellular network identity. The cellular network identity is in this embodiment labelled either a pseudonym identity or a fast re-authentication identity.

In particular embodiments, where the unique representation is stored as a labelled cellular network identity, the step of retrieving 242 comprises retrieving the cellular network identity comprising the unique representation and a label from the memory in the user equipment. The step 244 may then interpreted as checking that there is a stored label of either a pseudonym identity or a fast re-authentication identity.

In step 246, the cellular network identity comprising the unique representation is sent as a user identity, in the form of a pseudonym identity or a fast re-authentication identity, in an attach procedure to the wireless communication network. The process ends in step 259.

The wireless communication network is in one embodiment the cellular network associated with the cellular network identity.

The wireless communication network is in another embodiment a wireless local area network.

In a particular embodiment, the step of sending 246 comprises sending the cellular network identity as a pseudonym identity or a fast re-authentication identity in an Extensible Authentication Protocol.

In a particular embodiment, the wireless local area network is a WiFi network.

In a particular embodiment, the cellular network is a 3GPP cellular network.

At the network side, a receiving process is provided.

FIG. 9 illustrates a flow diagram of steps of an embodiment of a method for assisting in attaching a user equipment to a wireless communication network. The process starts in step 260. In step 262, a user identity is received in a network node from a user equipment. In particular embodiments, this receiving is a part of an attach procedure. The step of receiving comprises receiving of the cellular network identity as a username which is equal to a pseudonym identity or a fast re-authentication identity, e.g. in an Extensible Authentication Protocol. In step 264, it is determined whether or not the received user identity is a cellular network identity comprising a unique representation of a user equipment context of the user equipment and in what cellular network node the user equipment is or is going to be attached. In a particular embodiment, the step of determining comprises identification of a labelling of the cellular network identity. If it is determined that the received user identity is a cellular network identity, as illustrated by step 266, step 268 is performed, in which an authentication procedure is directed towards an authentication node defined by the cellular network identity. The process ends in step 279.

In a particular embodiment, the network node is a network node of the cellular network associated with the cellular network identity.

In another particular embodiment, the network node is a network node of a wireless local area network.

In a particular embodiment, the wireless local area network is a WiFi network.

In a particular embodiment, the cellular network is a 3GPP cellular network.

In one embodiment, the UE use of the cellular network identity, e.g. the 3GPP identity, is performed compatible with 802.11 standards. However, when the UE receives the pseudonym or fast re-authentication identity it should use these as identity at the next authentication procedure or fast re-authentication procedure. At that time the access network (e.g., TWAG in the case of trusted access or ePDG in the case of untrusted access) can directly use the 3GPP identity to find the 3GPP node (e.g., SGSN/MME).

The particular format of the cellular network identity, e.g. the 3GPP identity, is not very crucial for the here presented technology to operate, as such, however, it is an advantage if already existing parameters may be used. The cellular network identity may for instance be formed similar to a pseudonym identity. The pseudonym identity is a string that can be formatted in any way. One way to format the cellular network identity is to just use the GUTI value of the UE or any representation thereof.

The format can as mentioned above also comprise a labelling. In one embodiment, this label may be a prefix that indicate to TWAG/ePDG if pseudonym identity contain a cellular network identity, e.g. a 3GPP identity, and TWAG/ePDG shall therefore select SGSN/MME based on 3GPP identity. If the prefix is not present, TWAG/ePDG shall choose AAA as in the legacy solution.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

Figure 10:
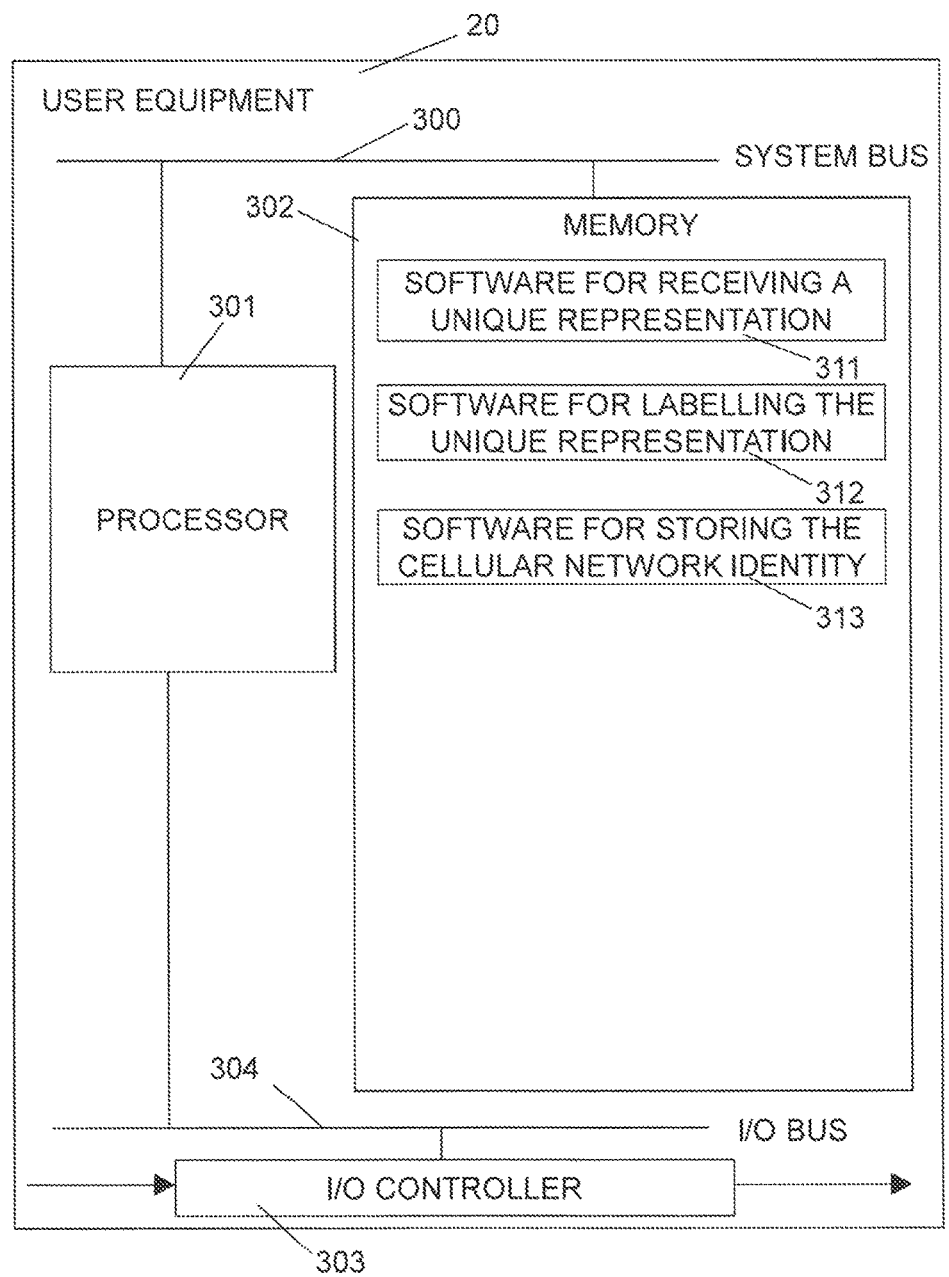
FIG. 10 illustrates schematically an embodiment of a user equipment.

FIG. 10 illustrates schematically an embodiment of a user equipment 20. The user equipment 20 is capable to attach to a cellular network and to a wireless local area network. The user equipment 20 comprises an input, illustrated as an I/O bus 304 and an I/O controller 303. The user equipment 20 further comprises a processor 301, a memory 302 and a system bus 300 for communication between the different parts. The memory 302 comprises instructions, illustrated as software entities 311-313; software for receiving a unique representation from a network node, software for labelling the unique representation as a cellular network identity and software for storing the cellular network identity in the memory 302. The instructions are executable by the processor 301 whereby the user equipment 20 is operative to receive a unique representation of a user equipment context of the user equipment and in what cellular network node the user equipment is or is going to be attached. This unique representation is received from a network node via the input, in this embodiment the I/O bus 304 and the I/O controller 303. The user equipment 20 is by the instructions further operative to label the unique representation as a cellular network identity and to store the cellular network identity in the memory.

In a particular example, where the network node provides the unique representation already labeled as a cellular network identity, the software for labelling the unique representation as a cellular network identity is omitted.

In a particular embodiment, the network node is a network node of the cellular network.

In a particular embodiment, the network node is a network node of the wireless local area network.

In a particular embodiment, the wireless local area network is WiFi network.

In a particular embodiment, the cellular network is a 3GPP cellular network.

Figure 11:
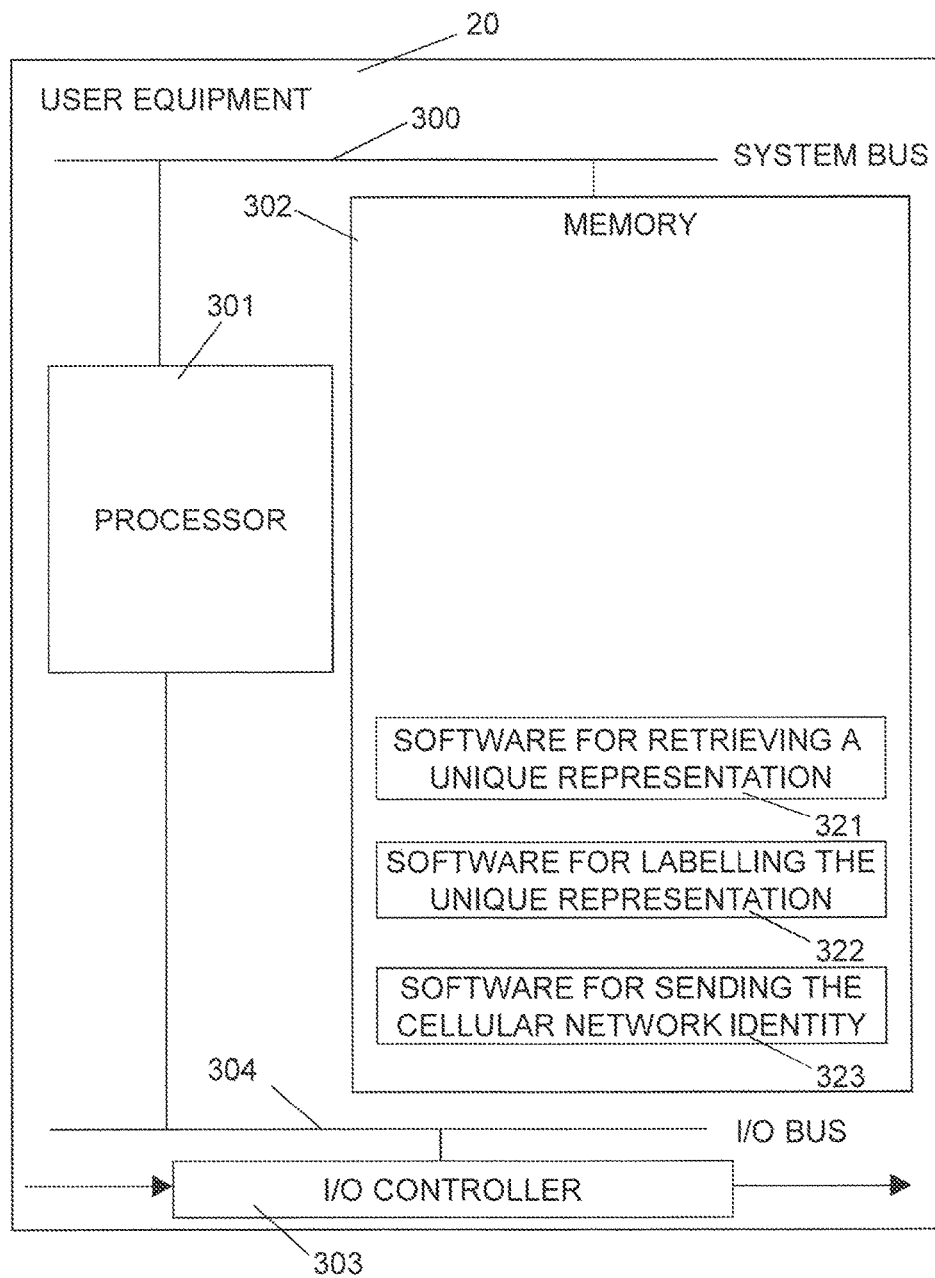
FIG. 11 illustrates schematically an embodiment of a user equipment.

FIG. 11 illustrates schematically an embodiment of a user equipment 20. The user equipment 20 is capable to attach to a cellular network and to a wireless local area network. The user equipment 20 comprises an output, illustrated as an I/O bus 304 and an I/O controller 303. The user equipment 20 further comprises a processor 301, a memory 302 and a system bus 300 for communication between the different parts. The memory 302 comprises instructions, illustrated as software entities 321-323; software for retrieving a unique representation from the memory 302, software for labelling the unique representation as a cellular network identity and software for sending the cellular network identity to the wireless communication network. The instructions are executable by the processor 301 whereby the user equipment 20 is operative to retrieve, from the memory 302, a unique representation of a user equipment context of the user equipment and in what cellular network node the user equipment is or is going to be attached. The user equipment 20 is by the instructions further operative to label the unique representation as the cellular network identity.

The user equipment 20 is by the instructions further operative to send, via the output, in this particular embodiment the I/O bus 304 and the I/O controller 303, a cellular network identity comprising the unique representation as a user identity in an attach procedure to the wireless communication network.

In a particular embodiment, where the cellular network identity is stored in the memory 302, the instructions causes the user equipment to be further operative to retrieve the cellular network identity comprising the unique representation and a label thereof from the memory 302 in the user equipment 20. The software 322 for labelling the unique representation as a cellular network identity may then be omitted.

In a particular embodiment, the wireless communication network is the cellular network associated with the cellular network identity.

In a particular embodiment, the wireless communication network is a wireless local area network.

In a particular embodiment, the user equipment is further operative by the software 323 software for sending the cellular network identity to the wireless communication network to send the cellular network identity as a pseudonym identity or a fast re-authentication identity in an Extensible Authentication Protocol.

In a particular embodiment, the wireless local area network is WiFi network.

In a particular embodiment, the cellular network is a 3GPP cellular network.

Figure 12:
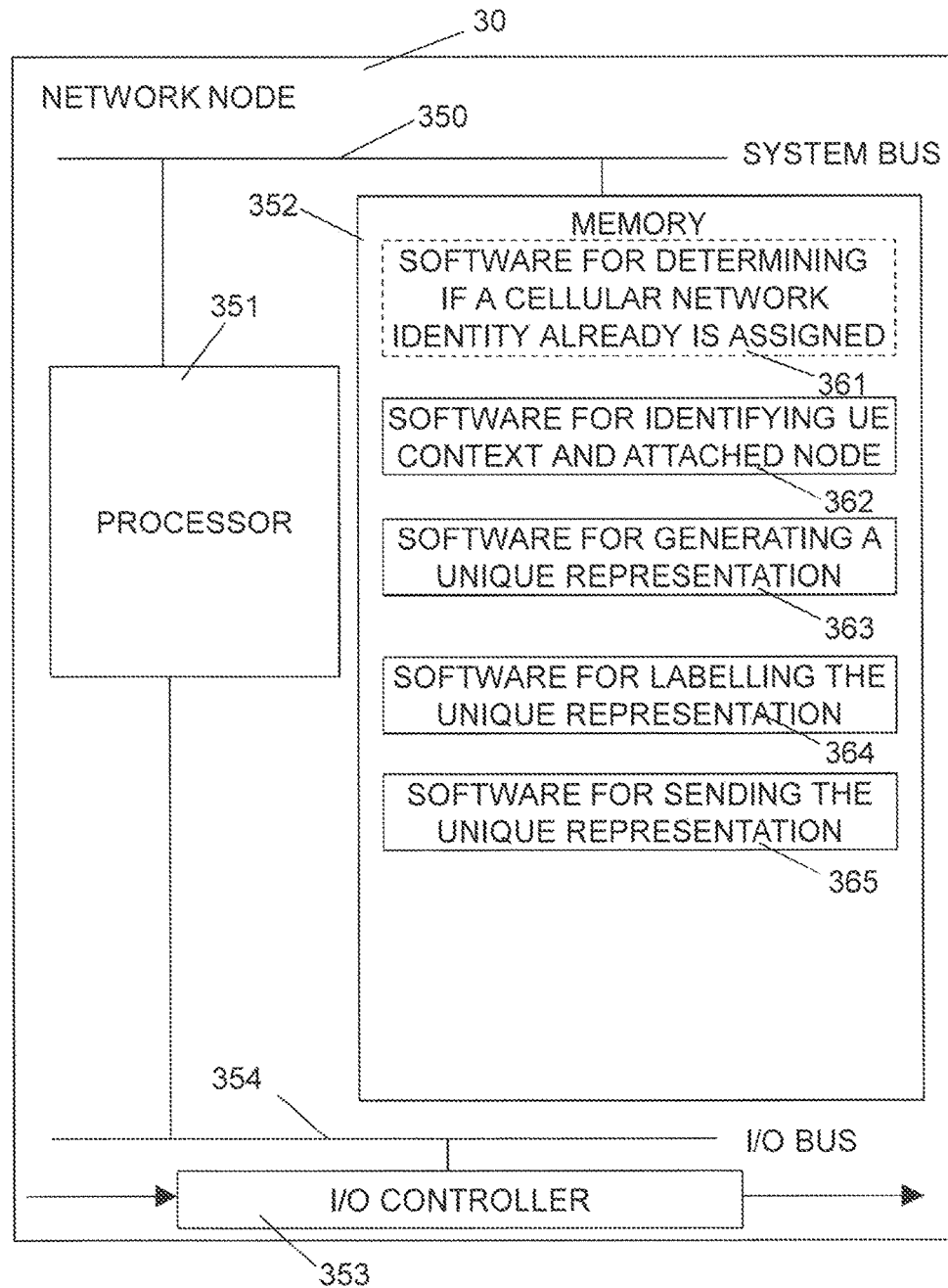
FIG. 12 illustrates schematically an embodiment of a network node.

FIG. 12 illustrates schematically an embodiment of a network node 30 of a communication network. The network node 30 comprises an input, and an output, illustrated in common as an I/O bus 354 and an I/O controller 353. The network node 30 further comprises a processor 351, a memory 352 and a system bus 350 for communication between the different parts. The memory 352 comprises instructions, illustrated as software entities 361-365; software for determining whether or not the user equipment already has an assigned cellular network identity, software for identifying a user equipment context of the user equipment and in what cellular network node the user equipment is or is going to be attached, software for generating a unique representation of the identified user equipment context and the cellular network node, software for labelling the unique representation as a cellular network identity and software for sending the unique representation to the user equipment. The instructions are executable by the processor 351 whereby the network node 30 is operative to identify, as a response to an attach message from a user equipment, a user equipment context of the user equipment and in what cellular network node the user equipment is or is going to be attached. The network node 30 is further operative to generate a unique representation of the identified user equipment context and the cellular network node. The network node 30 is further operative to send the unique representation via the output to the user equipment.

In particular embodiments, the software for determining whether or not the user equipment already has an assigned cellular network identity may be omitted.

In particular embodiments having the software for determining whether or not the user equipment already has an assigned cellular network identity, the network node 30 is operative to determine whether or not the user equipment already has an assigned cellular network identity, whereby the identifying, generating and sending are performed if the user equipment already does not have the cellular network identity assigned.

In particular embodiments, the software for labelling the unique representation as a cellular network identity may be omitted.

In particular embodiments having the software for labelling the unique representation as a cellular network identity, the network node 30 is operative to label the unique representation as a cellular network identity.

In a particular embodiment, the network node 30 is a network node of the cellular network associated with the cellular network identity.

In another particular embodiment, the network node 30 is a network node of a wireless local area network.

In a particular embodiment, the wireless local area network is WiFi network.

In a particular embodiment, the cellular network is a 3GPP cellular network.

Figure 13:
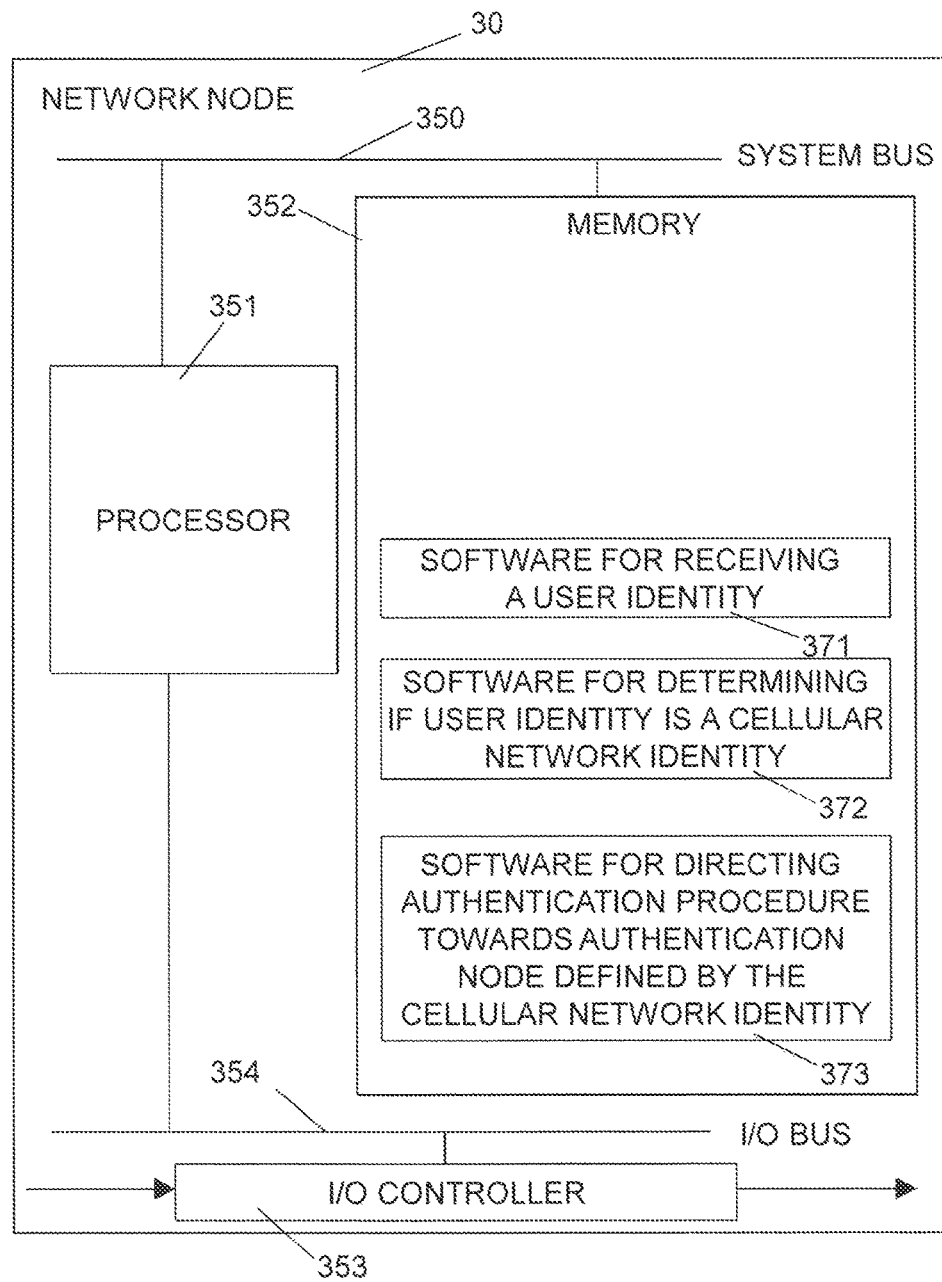
FIG. 13 illustrates schematically an embodiment of a network node.

FIG. 13 illustrates schematically an embodiment of a network node 30 of a communication network. The network node 30 comprises an input, and an output, illustrated in common as an I/O bus 354 and an I/O controller 353. The network node 30 further comprises a processor 351, a memory 352 and a system bus 350 for communication between the different parts. The memory 352 comprises instructions, illustrated as software entities 371-373; software for receiving a user identity from a user equipment, software for determining whether or not the received user identity is a cellular network identity and software for directing, if determined that the received user identity is a cellular network identity, an authentication procedure towards an authentication node defined by the cellular network identity. The instructions are executable by the processor 351 whereby the network node 30 is operative to receive a user identity from a user equipment via the input. The network node 30 is further operative to determine whether or not the received user identity is a cellular network identity comprising a unique representation of a user equipment context of the user equipment and in what cellular network node the user equipment is or is going to be attached. The network node 30 is further operative to direct, if determined that the received user identity is a cellular network identity, an authentication procedure towards an authentication node defined by the cellular network identity.

In a particular embodiment, the software 372 for determining whether or not the received user identity is a cellular network identity causes the network node 30 to be further operative to identify a labelling of the cellular network identity.

In a particular embodiment, the network node 30 is a network node of the cellular network associated with the cellular network identity.

In a particular embodiment, the network node is a network node of a wireless local area network.

In a particular embodiment, the software 371 for receiving a user identity from a user equipment causes the network node to be further operative to receive the cellular network identity as a pseudonym identity or a fast re-authentication identity in an Extensible Authentication Protocol.

In a particular embodiment, the wireless local area network is WiFi network.

In a particular embodiment, the cellular network is a 3GPP cellular network.

Above, examples of computer implementations were described. The network node and user equipment, respectively, comprises processing circuitry such as one or more processors and a memory. In these particular examples, at least some of the steps, functions, procedures, modules and/or blocks described herein are implemented in a computer program, which is loaded into the memory for execution by the processing circuitry. The processing circuitry and memory are interconnected to each other to enable normal software execution. An optional input/output device may also be interconnected to the processing circuitry and/or the memory to enable input and/or output of relevant data such as input parameter(s) and/or resulting output parameter(s).

The term 'computer' should be interpreted in a general sense as any system or device capable of executing program code or computer program instructions to perform a particular processing, determining or computing task.

In a particular embodiment, the computer program comprises instructions, which when executed by at least one processor, cause the processor(s) to perform different operations. The computer program resides in a memory.

In one embodiment, the computer program comprising program code, which when executed by a processing circuitry causes the processing circuitry to receive, from a network node via an input, a unique representation of a user equipment context of the user equipment and in what cellular network node the user equipment is or is going to be attached, to label the unique representation as a cellular network identity, and to store the cellular network identity in the memory.

In one embodiment, the computer program comprising program code, which when executed by a processing circuitry causes the processing circuitry to retrieve, from a memory, a unique representation of a user equipment context of the user equipment and in what cellular network node the user equipment is or is going to be attached, and to send, via an output, a cellular network identity comprising the unique representation as a user identity in an attach procedure to the wireless communication network.

In one embodiment, the computer program comprising program code, which when executed by a processing circuitry causes the processing circuitry to identify, as a response to an attach message from a user equipment, a user equipment context of the user equipment and in what cellular network node the user equipment is or is going to be attached, to generate a unique representation of the identified user equipment context and the cellular network node, and to send the unique representation via the output to the user equipment.

In one embodiment, the computer program comprising program code, which when executed by a processing circuitry causes the processing circuitry to receive a user identity from a user equipment via an input, to determine whether or not the received user identity is a cellular network identity comprising a unique representation of a user equipment context of the user equipment and in what cellular network node the user equipment is or is going to be attached, and to direct, if determined that the received user identity is a cellular network identity, an authentication procedure towards an authentication node defined by the cellular network identity.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

The software or computer program may thus be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Blueray disc, a Universal Serial Bus, USB, memory, a Hard Disk Drive, HDD storage device, a flash memory, a magnetic tape, or any other conventional memory device. The computer program may thus be loaded into the operating memory of a computer or equivalent processing device for execution by the processing circuitry thereof.

In one embodiment, a computer program product comprises a computer-readable medium on which a computer program is stored. The computer program comprises program code, which when executed by a processing circuitry causes the processing circuitry to receive, from a network node via the input, a unique representation of a user equipment context of the user equipment and in what cellular network node the user equipment is or is going to be attached, to label the unique representation as a cellular network identity and to store the cellular network identity in the memory.

In one embodiment, a computer program product comprising a computer-readable medium on which a computer program is stored. The computer program comprises program code, which when executed by a processing circuitry causes the processing circuitry to retrieve, from a memory, a unique representation of a user equipment context of the user equipment and in what cellular network node the user equipment is or is going to be attached, and to send, via an output, a cellular network identity comprising the unique representation as a user identity in an attach procedure to the wireless communication network.

In one embodiment, a computer program product comprises a computer-readable medium on which a computer program is stored, which computer program comprises program code, which when executed by a processing circuitry causes the processing circuitry to identify, as a response to an attach message from a user equipment, a user equipment context of the user equipment and in what cellular network node the user equipment is or is going to be attached, to generate a unique representation of the identified user equipment context and the cellular network node, and to send the unique representation via the output to the user equipment.

In one embodiment, a computer program product comprises a computer-readable medium on which a computer program is stored. The computer program comprises program code, which when executed by a processing circuitry causes the processing circuitry to receive a user identity from a user equipment via the input, to determine whether or not the received user identity is a cellular network identity comprising a unique representation of a user equipment context of the user equipment and in what cellular network node the user equipment is or is going to be attached, and to direct, if determined that the received user identity is a cellular network identity, an authentication procedure towards an authentication node defined by the cellular network identity.

The network node and user equipment, respectively, is thus configured to perform, when executing the computer program, well-defined processing tasks such as those described herein.

The computer or processing circuitry does not have to be dedicated to only execute the above-described steps, functions, procedure and/or blocks, but may also execute other tasks.

As indicated herein, the user equipment and/or network node may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. Examples of such function modules are illustrated in FIGS. 14-17.

Figure 14:
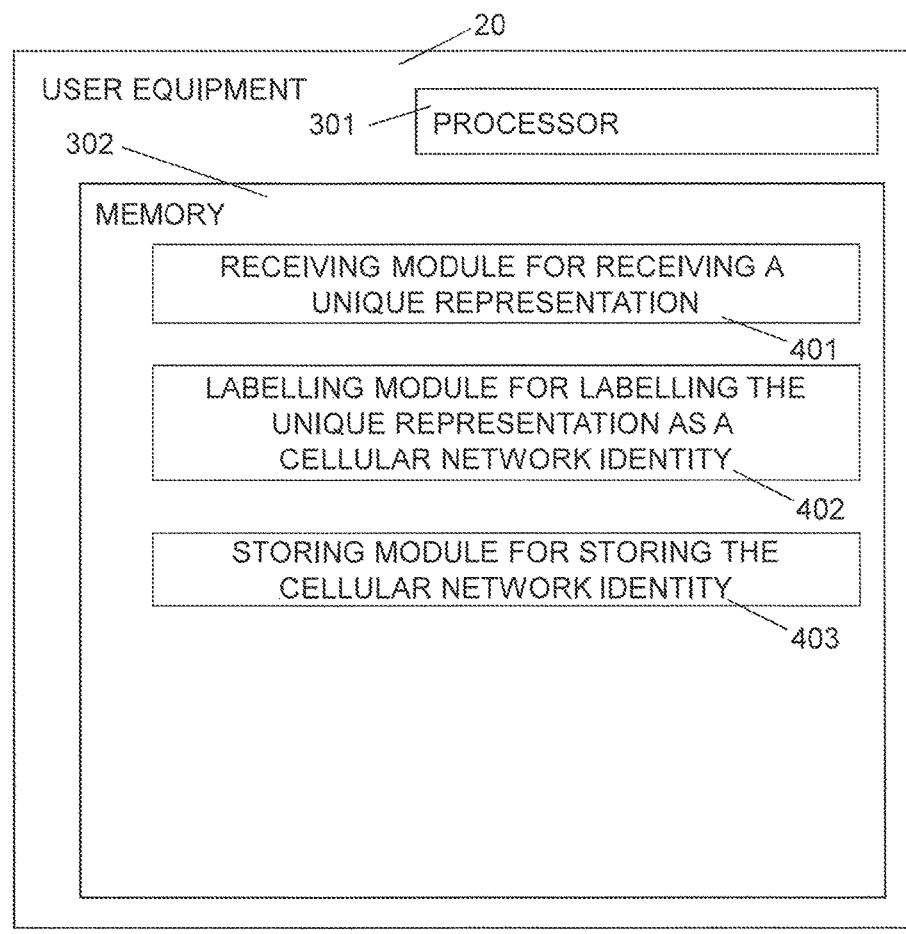
FIG. 14 is a schematic block diagram illustrating an embodiment of a user equipment.

FIG. 14 is a schematic block diagram illustrating an example of a user equipment 20 comprising a group of function modules. The user equipment is capable to attach to a cellular network and a wireless local area network. The user equipment comprises a receiving module 401 for receiving a unique representation of a user equipment context of the user equipment and in what cellular network node the user equipment is or is going to be attached, from a network node. The user equipment may further comprises a labelling module 402 for labelling the unique representation as a cellular network identity. The user equipment further comprises a memory 302. The user equipment further comprises a storing module 403 for storing the cellular network identity in the memory 302.

Figure 15:
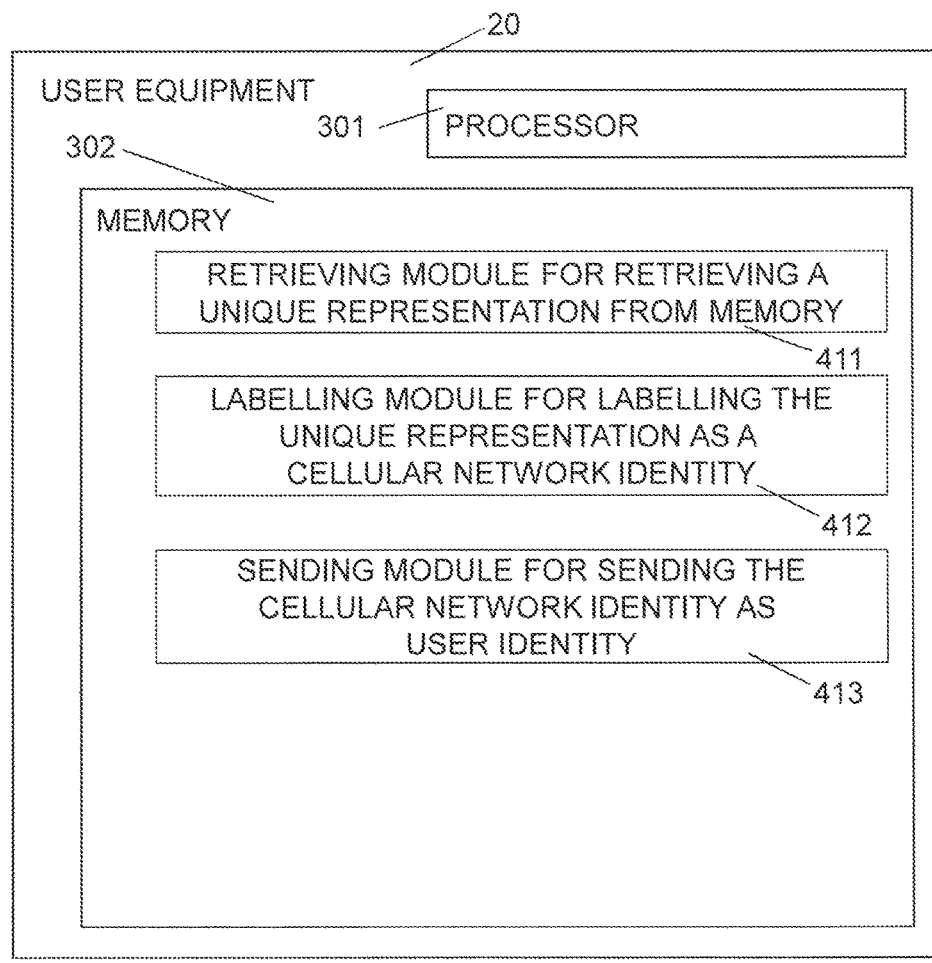
FIG. 15 is a schematic block diagram illustrating an embodiment of a user equipment.

FIG. 15 is a schematic block diagram illustrating an example of a user equipment 20 comprising a group of function modules. The user equipment 20 is capable to attach to a cellular network and a wireless local area network. The user equipment comprises a memory 302. The user equipment further comprises a retrieving module 411 for retrieving, from the memory 302, a unique representation of a user equipment context of the user equipment and in what cellular network node the user equipment is or is going to be attached. The user equipment comprises a labelling module 412 for labelling the unique representation as a cellular network identity. The user equipment further comprises a sending module 413 for sending a cellular network identity comprising the unique representation as a user identity in an attach procedure to the wireless communication network.

Figure 16:
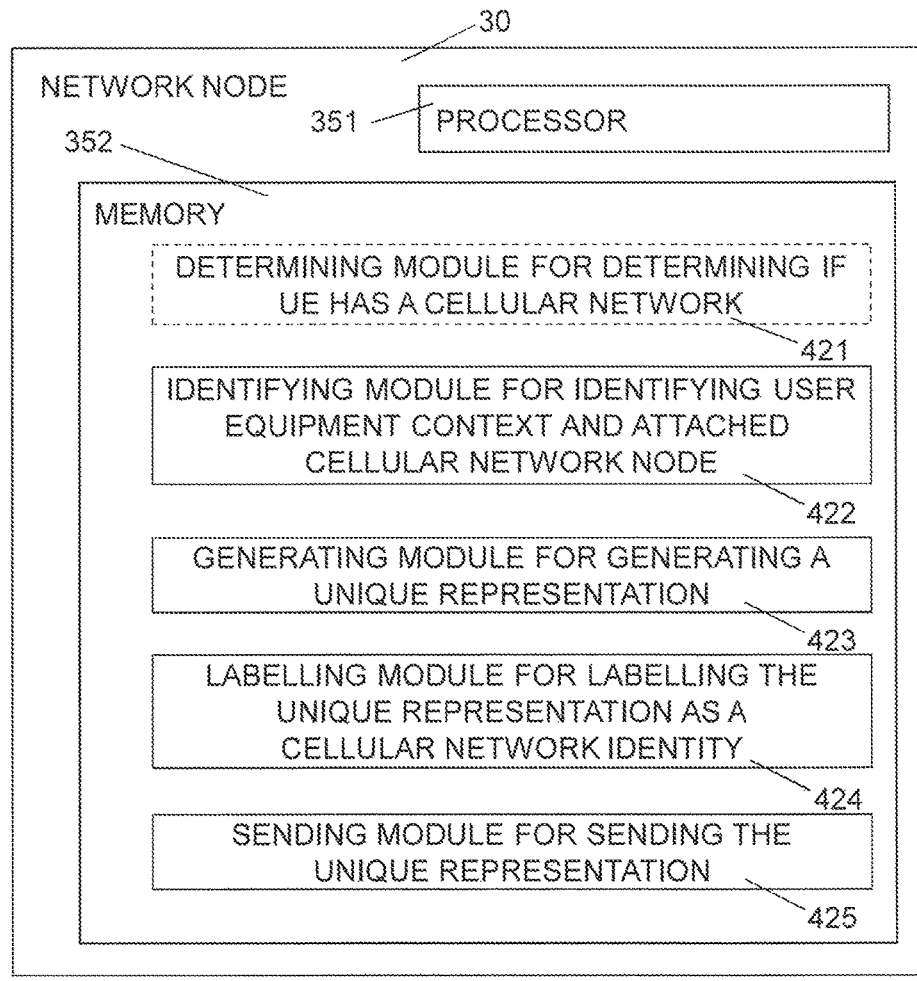
FIG. 16 is a schematic block diagram illustrating an embodiment of a network node.

FIG. 16 is a schematic block diagram illustrating an example of a network node 30 in a wireless communication network comprising a group of function modules. The network node 30 comprises an identifying module 422 for identifying, as a response to an attach message from a user equipment, a user equipment context of the user equipment and in what cellular network node the user equipment is or is going to be attached. The network node 30 further comprises a generating module 423 for generating a unique representation of the identified user equipment context and the cellular network node. The network node 30 further comprises a sending module 425 for sending the unique representation to the user equipment. The network node 30 may optionally comprise a determining module 421 for determining whether or not the user equipment already has an assigned cellular network identity. Network node 30 comprises a labelling module 424 for labelling the unique representation as a cellular network identity.

Figure 17:
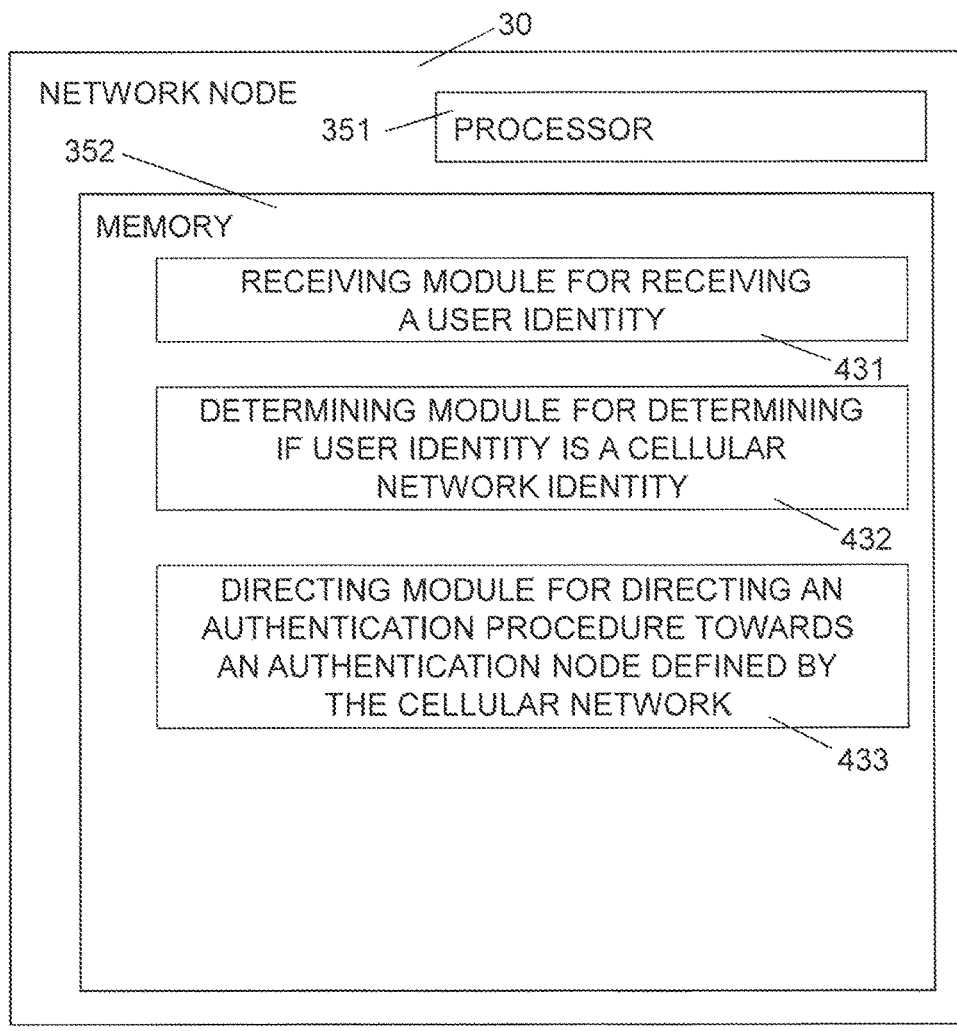
FIG. 17 is a schematic block diagram illustrating an embodiment of a network node.

FIG. 17 is a schematic block diagram illustrating an example of a network node 30 in a wireless communication network comprising a group of function modules. The network node 30 comprises a receiving module 431 for receiving a user identity from a user equipment. The network node 30 further comprises a determining module 432 for determining whether or not the received user identity is a cellular network identity comprising a unique representation of a user equipment context of the user equipment and in what cellular network node the user equipment is or is going to be attached. The network node 30 further comprises a directing module 433 for directing, if determined that the received user identity is a cellular network identity, an authentication procedure towards an authentication node defined by the cellular network identity.

The present presentation propose that the network should provide a 3GPP identity as pseudonym or fast re-authentication ID to the UE so that the network can easily find the 3GPP node and context when UE do attach procedure (trusted or untrusted) on WLAN. By using this solution it is possible for the network to locate the UE context early in the attach procedure and coordinate between 3GPP and WiFi access.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATION EXPLANATION

3GPP 3$^{rd}$ Generation Partnership Project
AAA Authentication Authorization Accounting
AKA Authentication and Key Agreement
AP Access Point
APN Access Point Name
ASIC Application Specific Integrated Circuit
BNG Broadband Network Gateway
BTS Base Transceiver Station
CD Compact Disc
CPE Customer Premises Equipment
CPU Central Processing Unit
DSP Digital Signal Processor
DVD Digital Versatile Disc
EAP Extensible Authentication Protocol
EAPOL EAP over LAN
EPC Evolved Packet Core
ePDG Evolved Packet Data Gateway
ESS Extended Service Set
E-UTRAN Evolved Universal Terrestrial Radio Access Network
FPGA Field Programmable Gate Array
GSM Global System for Mobile communications
GTK Group Temporal Key
GUTI Global Unique Temporary Identifier
GW Gateway
HDD Hard Disk Drive
HLR/AuC Home Location Register/Authentication Centre
HSS Home Subscriber Server
IETF Internet Engineering Task Force
IKE Internet Key Exchange
IMSI International Mobile Subscriber Identity
IPsec IP security
LEE Laptop Embedded Equipment
LME Laptop Mounted Equipment
MIC Message Integrity Code
MME Mobility Management Entity
NAT Network Address Translator
PBNC Port-Based Network Control
PC Personal Computer
PDA Personal Digital Assistant
PDN Packet Data Network
PGW, PDN-GW PDN Gateway
PLC Programmable Logic Controller
PLMN Public Land Mobile Network
PMK Pairwise Master Key
PTK Pairwise Temporal Key
RAM Random Access Memory
RAND Random number
RG Residential Gateway
RNC Radio Network Controller
ROM Read-Only Memory
RRU Remote Radio Unit
RSN Retransmission Sequence Number
SA Security Association
SGSN Serving General packet radio services Support Node
SNounce Supplicant Nounce
SIM Subscriber Identity Module
SRES Signal RESponse
SSID Service Set Identifier
STA Station
TWAG Trusted WLAN Access Gateway
UE User Equipment
USB Universal Serial Bus
VPLMN Visited PLMN
WLAN Wireless Local Area Network

The invention claimed is:

1. A method for assigning a cellular network identity adapted for both cellular and non-cellular access to a communication network, the method comprising:
   identifying, by a network node of the communication network as a response to an attach message from the user equipment, a user equipment context of the user equipment and to what cellular network node the user equipment is or is going to be attached, wherein the cellular network node functions as an authenticator for both cellular and non-cellular access to the communication network;
   generating a unique representation of the identified user equipment context and the cellular network node;
   labelling the unique representation as a cellular network identity adapted for both cellular and non-cellular access, the cellular network identity being one of a pseudonym identity and a fast re-authentication identity; and
   sending the unique representation to the user equipment as the one of a pseudonym identity and a fast re-authentication identity.

2. The method of claim 1:
   further comprising determining whether or not the user equipment already has an assigned cellular network identity;
   wherein the identifying, generating, labelling, and sending are performed if the user equipment already does not have the cellular network identity assigned.

3. The method of claim 1, wherein the network node is a network node of the cellular network associated with the cellular network identity.

4. The method of claim 1, wherein the network node is a network node of a wireless local area network.

5. The method of claim 1, wherein the sending is performed using at least one protocol of the group consisting of:
   Radius;
   Diameter;
   Extensible Authentication Protocol Over Local Area Network (EAPOL);
   Internet Key Exchange version 2 (IKEv2);
   Extensible Authentication Protocol Subscriber Identity Module (EAP-SIM); and
   Extensible Authentication Protocol Authentication and Key Agreement (EAP-AKA).

6. The method of claim 1, wherein the wireless local area network is WiFi network.

7. The method of claim 1, wherein the cellular network is a 3GPP cellular network.

8. The method of claim 3 further comprising:
receiving, at a first occasion, an attach request the cellular network identity originating from the UE forwarded by another non-cellular network node in a non-cellular cellular access network; and
authenticating the UE based on the cellular network identity received via the non-cellular network node.

9. A network node of a communication network adapted to assign a cellular network identity to a user equipment for both cellular and non-cellular access to the communication network, the network node comprising:
an input;
an output;
processing circuitry;
memory containing instructions executable by the processing circuitry whereby the network node is operative to:
identify, responsive to an attach message received from a user equipment via the input, a user equipment context of the user equipment and to what cellular network node the user equipment is or is going to be attached, wherein the cellular network node functions as an authenticator for both cellular and non-cellular access;
generate a unique representation of the identified user equipment context and the cellular network node;
label the unique representation as a cellular network identity adapted for both cellular and non-cellular access, the cellular network identity being one of a pseudonym identity and a fast re-authentication identity; and
send the unique representation via the output to the user equipment as the one of a pseudonym identity and a fast re-authentication identity.

10. A computer program product stored in a non-transitory computer readable medium for controlling a network node in a communication network, the computer program product comprising software instructions which, when run on processing circuitry of the network node, causes the network node to:
identify, responsive to an attach message from a user equipment, a user equipment context of the user equipment and to what cellular network node the user equipment is or is going to be attached, wherein the cellular network node functions as an authenticator for both cellular and non-cellular access to the communication network;
generate a unique representation of the identified user equipment context and the cellular network node;
label the unique representation as a cellular network identity adapted for both cellular and non-cellular access to the communication network, the cellular network identity being one of a pseudonym identity and a fast re-authentication identity; and
send the unique representation to the user equipment as the one of a pseudonym identity and a fast re-authentication identity.

11. A method for identifying a user equipment upon attaching a user equipment to a wireless communication network, the method comprising:
retrieving, from a memory of the user equipment, a unique representation of a user equipment context of the user equipment and to what cellular network node the user equipment is or is going to be attached, wherein the cellular network node functions as an authenticator for both cellular and non-cellular access to the communication network;
labelling the unique representation as a cellular network identity adapted for both cellular and non-cellular access to the communication network, the cellular network identity being one of a pseudonym identity and a fast re-authentication identity;
sending, to the wireless communication network, the cellular network identity comprising the unique representation as a user identity in an attach procedure.

12. A user equipment capable to attach to a cellular network and a wireless local area network, the user equipment comprising:
an output;
processing circuitry;
memory containing instructions executable by the processing circuitry whereby the user equipment is operative to:
retrieve, from the memory, a unique representation of a user equipment context of the user equipment and to what cellular network node the user equipment is or is going to be attached, wherein the cellular network node functions as an authenticator for both cellular and non-cellular access to the communication network;
label the unique representation as a cellular network identity adapted for both cellular and non-cellular access to the communication network, the cellular network identity being one of a pseudonym identity and a fast re-authentication identity; and
send, to the wireless communication network via the output, a cellular network identity comprising the unique representation as a user identity in an attach procedure.

13. The user equipment of claim 12, wherein the wireless local area network is WiFi network.

14. The user equipment of claim 12, wherein the cellular network is a 3 GPP cellular network.

15. A computer program product stored in a non-transitory computer readable medium for controlling a user equipment, the computer program product comprising software instructions which, when run on processing circuitry of the user equipment, causes the user equipment to:
retrieve, from a memory, a unique representation of a user equipment context of the user equipment and to what cellular network node the user equipment is or is going to be attached, wherein the cellular network node functions as an authenticator for both cellular and non-cellular access to the communication network;
label the unique representation as a cellular network identity adapted for both cellular and non-cellular access to the communication network, the cellular network identity being one of a pseudonym identity and a fast re-authentication identity; and
send, to a wireless communication network, the cellular network identity comprising the unique representation as a user identity in an attach procedure.

16. A method for assigning a cellular network identity, the method comprising:
sending, by a user equipment capable to attach to a cellular network and a wireless local area network, an attach message to a network node;
in response to sending the attach message, receiving, from the network node, a unique representation of a user equipment context of the user equipment and to what cellular network node the user equipment is or is going to be attached,
    wherein the cellular network node functions as an authenticator for both cellular and non-cellular access to the communication network;
labelling the unique representation as a cellular network identity adapted for both cellular and non-cellular access to the communication network; and
storing the cellular network identity as at least one of a pseudonym identity and a fast re-authentication identity in a memory of the user equipment.

17. A user equipment capable to attach to a cellular network and a wireless local area network, the user equipment comprising:
    an output;
    an input;
    processing circuitry;
    memory containing instructions executable by the processing circuitry whereby the user equipment is operative to:
        send, via the output, an attach message to a network node;
        receive, from the network node via the input, a unique representation of a user equipment context of the user equipment and to what cellular network node the user equipment is or is going to be attached, wherein the cellular network node functions as an authenticator for both cellular and non-cellular access to the communication network;
        label the unique representation as a cellular network identity adapted for both cellular and non-cellular access to the communication network; and
        store the cellular network identity as at least one of a pseudonym identity and a fast re-authentication identity in the memory.

18. A computer program product stored in a non-transitory computer readable medium for controlling a user equipment, the user equipment capable of attaching to a cellular network and a wireless local area network, the computer program product comprising software instructions which, when run on processing circuitry of the user equipment, causes the user equipment to:
    send an attach message to a network node;
    receive, from the network node, a unique representation of a user equipment context of the user equipment and to what cellular network node the user equipment is or is going to be attached, wherein the cellular network node functions as an authenticator for both cellular and non-cellular access to the communication network;
    label the unique representation as a cellular network identity adapted for both cellular and non-cellular access to the communication network; and
store the cellular network identity as at least one of a pseudonym identity and a fast re-authentication identity in a memory.

* * * * *